(12) United States Patent
Kuznicki et al.

(10) Patent No.: US 8,282,709 B2
(45) Date of Patent: Oct. 9, 2012

(54) REMOVAL OF ETHANE FROM NATURAL GAS AT HIGH PRESSURE

(75) Inventors: Steven Mitchell Kuznicki, Edmonton (CA); Adolfo Maria Avila, Edmonton (CA); Meng Shi, Edmonton (CA); Vernon Lindsay Strom, Calgary (CA); Patricio S. Herrera, Calgary (CA)

(73) Assignee: The Governors of the University of Alberta, Alberta (CA)

( * ) Notice: Subject to any disclaimer, the term of this patent is extended or adjusted under 35 U.S.C. 154(b) by 274 days.

(21) Appl. No.: 12/803,524

(22) Filed: Jun. 29, 2010

(65) Prior Publication Data
US 2011/0315012 A1    Dec. 29, 2011

(51) Int. Cl.
*B01D 53/04* (2006.01)
*B01D 53/047* (2006.01)
(52) U.S. Cl. .................................. 95/143; 585/820
(58) Field of Classification Search .............. 95/96, 143; 423/210; 585/800, 820; 208/310 Z
See application file for complete search history.

(56) References Cited

U.S. PATENT DOCUMENTS

| | | | |
|---|---|---|---|
| 3,430,418 A | 3/1969 | Wagner | |
| 4,322,394 A | 3/1982 | Mezey et al. | |
| 4,589,888 A | 5/1986 | Hiscock et al. | |
| 4,938,939 A | 7/1990 | Kuznicki | |
| 5,011,591 A | 4/1991 | Kuznicki | |
| 5,013,334 A | 5/1991 | Maurer | |
| 5,171,333 A | 12/1992 | Maurer | |
| 5,208,006 A | 5/1993 | Kuznicki et al. | |
| 5,244,650 A | 9/1993 | Kuznicki et al. | |
| 5,840,099 A | 11/1998 | Kratz et al. | |
| 5,906,954 A | 5/1999 | Koermer | |
| 6,068,682 A * | 5/2000 | Kuznicki et al. | 95/130 |
| 6,197,092 B1 | 3/2001 | Butwell et al. | |
| 6,293,999 B1 | 9/2001 | Cheng et al. | |
| 6,315,817 B1 | 11/2001 | Butwell et al. | |
| 6,387,159 B1 | 5/2002 | Butwell et al. | |
| 6,444,012 B1 | 9/2002 | Dolan et al. | |
| 6,497,750 B2 | 12/2002 | Butwell et al. | |
| 6,517,611 B1 | 2/2003 | Kuznicki et al. | |
| 6,521,020 B2 | 2/2003 | Butwell et al. | |
| 6,610,124 B1 | 8/2003 | Dolan et al. | |
| 7,314,503 B2 | 1/2008 | Landrum et al. | |
| 7,396,388 B2 | 7/2008 | Mitariten | |
| 7,442,233 B2 | 10/2008 | Mitariten | |
| 8,017,825 B2 * | 9/2011 | Kuznicki et al. | 585/829 |
| 2005/0203327 A1 | 9/2005 | Jovanovic et al. | |
| 2006/0191410 A1 | 8/2006 | Dolan et al. | |
| 2009/0216059 A1 | 8/2009 | Reyes et al. | |

FOREIGN PATENT DOCUMENTS

| | | |
|---|---|---|
| CA | 2618267 A1 | 7/2009 |
| WO | WO 80/02558 | 11/1980 |

OTHER PUBLICATIONS

K. F. Loughlin, et al, Ind. Eng. Chem. Res., 1990,29,1535-1546.
H. B. Abdul-Rehman et al, Ind. Eng. Chem. Res., 1990,29,1525-1535.
N. A. Al-Baghli et al, J. Chem. Eng. Data, 2006, 51, 248-254.
N. A. Al-Baghli et al, J. Chem. Eng. Data, 2005, 50, 843-848.
M. W. Anderson et al, Nature, 367, Jan. 27, 1994, 347-351.
D. W. Breck, Zeolite Molecular Sieves: Structure, Chemistry, and Use, Chapter 8, Interscience Publication, John Wiley and Sons, London, 1974, p. 593-699.
S. M. Auerbach et al, Handbook of Zeolite Science and Technology, Marcel Dekker, Inc. NY~Basel, 2003, p. 1063-1104.
Kirk-Othmer Encyclopedia of Chemical Technology, vol. 1, Adsorption, Gas Separation, John Wiley & Sons, on line pub. Apr. 18, 2003, 617-663.
D. M. Ruthven, Principles of Adsorption and Adsorption Processes, John Wiley & Sons, NY, 1984, p. 29-61.

* cited by examiner

*Primary Examiner* — Frank Lawrence, Jr.
(74) *Attorney, Agent, or Firm* — Kenneth H Johnson

(57) ABSTRACT

ETS-10 type materials preferentially adsorb ethane and, if present, $C_{3+}$ paraffins from mixtures comprising methane, ethane and optionally $C_{3+}$ paraffins at pressures above 200 psia. A process in which ETS-10 type materials are used to separate ethane and $C_{3+}$ paraffins from natural gas streams at over 200 psia is provided.

18 Claims, 9 Drawing Sheets

A.

B.

REMOVAL OF ETHANE FROM NATURAL GAS AT HIGH PRESSURE

FIELD OF THE INVENTION

The present invention relates to adsorptive methods to separate paraffinic hydrocarbon components at high pressure. Specifically, the present invention employs ETS-10 type titanosilicate materials to separate ethane from methane at pressures of 200 psia or higher.

BACKGROUND OF THE INVENTION

Ethane extracted from natural gas is an important source of feedstock for ethylene production via industrial scale cracking processes.

The recovery of natural gas liquids (NGLs), such as ethane, from natural gas typically involves absorptive or cryogenic separation methods.

In absorptive separation, natural gas is brought into contact with a "lean" absorption oil which picks up NGLs by extractive absorption of like hydrocarbon compounds. The resulting "rich" absorption oil contains propane, butane and heavier hydrocarbons, while leaving lighter ethane fractions in the natural gas. In a typical process, heating the rich oil to temperatures above the boiling point of the $C_{3+}$ NGLs allows recovery of approximately 75% of the butane fraction and 85-90% of the pentane and heavier hydrocarbons fraction from a natural gas stream. Although alternative oil absorption methods which use refrigerated absorption oil allow for the recovery of some of the ethane, they are still less effective than cryogenic methods.

Cryogenic methods allow for as much as 90% or more of the ethane present in a natural gas stream to be recovered. Cryogenic processes generally involve cooling a natural gas stream to temperatures below around −120° Fahrenheit. These low temperature requirements have high associated energy consumption costs. For example, one way to lower the temperature of a natural gas stream is to use a turbo expansion process. In this process, refrigerants are used to cool the natural gas stream, followed by rapid gas expansion by an expansion turbine. Expanding the cooled gas produces a rapid temperature drop which condenses out NGLs, including ethane, while methane is left in the gas phase. Subsequently, the gaseous methane effluent must be recompressed to pipeline pressures, requiring further energy input.

In light of the poor efficiency for absorptive processes and the high cost associated with cryogenic methods, there has been interest in alternative technologies for removing NGLs from natural gas. One promising alternative is the use of adsorptive materials to selectively strip paraffinic hydrocarbons from natural gas by selective adsorption. It would be especially useful for the ethane derivatives industry if adsorption methods could separate methane and ethane fractions at high pressure, such as at natural gas pipeline pressures which are from about 200 psia to about 1500 psia. Such methods could augment or replace traditional high cost straddle plant technology which employs cryogenic separation to remove natural gas liquids such as ethane from natural gas streams and pipelines.

International Patent Application No. WO 80/02558 discloses that molecular sieves (4 Angstrom and 10 Angstrom) can be used to selectively adsorb ethane from a mixture containing methane and ethane. However, molecular sieves also adsorb high amounts of methane which can limit application to commercial adsorption/desorption swing processes.

Zeolites 5A and 13× have also been examined as potential materials for light paraffin gas separations. These zeolite materials preferentially adsorb ethane over methane from a binary mixture of the same, but do so with lackluster selectivity (see Loughlin, K. F.; Hasanain, M. A; and Abdul-Rehman, H. B. in Ind. Eng. Chem. Res. 1990, v29, p1535-1546). In a similar work, a silicalite material (Linde S-115) was shown to selectively adsorb ethane and higher paraffinic hydrocarbons over methane (see Abdul-Rehman, H. B.; Hasanain, M. A.; and Loughlin, K. F. in Ind. Eng. Chem. Res. 1990, v29, p1525-1535).

U.S. Pat. Nos. 5,013,334 and 5,171,333 both disclose the use of faujasite type zeolitic aluminosilicate materials in methane gas purification. A pressure swing adsorption process is disclosed in which ethane is selectively adsorbed from a mixture of methane and ethane. The faujasite type zeolites could be chosen from either X or Y type materials.

U.S. Pat. No. 5,840,099 discloses the use of activated alumina, zinc oxide or magnesium oxide for the selective uptake of water, $CO_2$, ethane and $C_{3+}$ paraffins from natural gas streams.

In light of the potential value of adsorptive methods for ethane sequestration or methane purification processes, alternative materials having high adsorption selectivity are desirable, especially where selectivity and performance may be readily tuned through facile material modification.

One such possibility is to use metal organic frameworks. U.S. Pat. Appl. No. 2009/0216059, shows that "zeolitic" imidazolate framework materials are able to selectively adsorb ethane and higher hydrocarbons ($C_{3+}$) from a feedstream containing the same mixed with methane.

Another interesting possibility is to use the EXS titanosilicate materials developed by Engelhard Corporation. EXS materials have octahedrally coordinated active sites in their crystal structure and are different from other types of zeolites. EXS zeolites also contain electrostatic units which are different from the charged units in conventional tetrahedrally coordinated aluminosilicate zeolites.

Members of the EXS family comprise all materials based on the structure of ETS-10, including ETS-10 (see U.S. Pat. No. 5,011,591), ETas-10 (see U.S. Pat. No. 5,244,650) and other framework substituted derivatives (see U.S. Pat. No. 5,208,006), as well as ETS-4 (see U.S. Pat. No. 4,938,939) and CTS-1 (see U.S. Pat. No. 6,517,611). Importantly, these materials can have their adsorptive selectivity and behavior radically altered through structural or ionic modification (see for example, CA Pat. Appl. No. 2,618,267). Hence, the performance of these materials can be finely tuned to suit a particular adsorptive application.

EST-4 and CTS-1 are reduced pore titanosilicates, dubbed Molecular Gate™ materials and are available from Engelhard. ETS-4 and CTS-1 have been used to remove polar components (e.g. $CO_2$) and nitrogen from natural gas streams. See for example, U.S. Pat. Nos. 6,197,092; 6,315,817; 6,444,012; 6,497,750; 6,610,124 and 7,314,503. As further shown in U.S. Pat. Nos. 6,610,124; 7,396,388; 7,442,233 and US Pat. Appl. No. 2006/0191410, Molecular Gate materials also selectively remove heavy hydrocarbons (i.e. $C_{3+}$ paraffinic hydrocarbons) from a natural gas stream while leaving methane and ethane components in the stream. Hence, ETS-4 and CTS-1 materials are unsuitable for methane/ethane adsorptive separation processes.

In contrast, ETS-10 has been shown to be selective for ethane adsorption over methane adsorption (see: Al-Baghli, N. A., Loughlin, K. F. Journal of Chemical and Engineering Data, 2005, v50, p. 843-848 and Al-Baghli, N. A., Loughlin, K. F. Journal of Chemical and Engineering Data, 2006, v51, 248-254). Engelhard Titanosilicate-10 (ETS-10) is a large-pored, mixed octahedral/tetrahedral titanium silicate molecular sieve with a framework composed of a three-dimensional network of interconnecting channels and cavities (see: U.S. Pat. No. 5,011,591 and Anderson, M. W., et al. in Nature 1994, v367, p. 347-351). ETS-10 has an effective pore size of 8 Å, much larger than the kinetic diameters of ethane and methane, 4.44 Å and 3.76 Å, respectively (see Breck, D. W., in Zeolite Molecular Sieves: Structure, Chemistry and Use; 1974 Wiley-Interscience Publication, John Wiley & Sons, London and Auerbach, S. M., Carrado K. A., in Gas Separation by Zeolites: Handbook of Zeolite Science and Technology, 2003 Marcel Dekker Inc.). As both ethane and methane can enter the crystalline lattice of ETS-10, separation of these species is achieved through equilibrium competitive adsorption.

The Al-Baghli references discussed above are silent to ETS-10 performance at pressures above 1000 kPa (145 psia). Further, the Al-Baghli references actually show that, for a given temperature, the selectivity of ethane/methane separation decreases as the pressure is increased, as is typical for molecular sieve separations, suggesting that these materials may be less suitable for adsorptive separation at higher pressures (see Table 4 of Al-Baghli, N. A. et al. in the Journal of Chemical and Engineering Data 2006, v51, p. 248-254, which shows that at 280K the relative adsorptivity for a binary ethane/methane system decreases from 45.23 at 150 kPa to 30.13 at 500 kPa). Finally, the Al-Baghli references fail to teach the use of cationically or structurally modified variants of the ETS-10 material.

U.S. Pat. Nos. 6,387,159 and 6,521,020 employ a Ca-ETS-10 material to remove hydrocarbons from acid gas streams such as $CO_2$ and especially $H_2S$ and discloses adsorption isotherms for propane, butane and pentane, but only at low pressure (i.e. up to 100 Torr). The patents are silent with respect to high pressure removal of ethane from a natural gas stream.

The present invention demonstrates that ETS-10 type materials do, in fact, show good ethane/methane adsorption selectivity at high pressure, including typical operating pressures for natural gas pipelines. We have also found that for some ETS-10 type materials, the ethane/methane selectivity can actually increase as the pressure is increased, which is surprising and unexpected in light of the prior art.

SUMMARY OF THE INVENTION

The present invention provides a process to separate ethane and, if present, $C_{3+}$ paraffinic hydrocarbons from natural gas streams at high pressure or from mixtures resembling natural gas streams at high pressures.

Provided is a process for the selective removal of ethane and, if present, $C_{3+}$ paraffins from a mixture comprising methane, ethane and optionally $C_{3+}$ paraffins, the process comprising contacting the mixture with an ETS-10 type material at a pressure of at least 200 psia. In an embodiment of the invention, a mixture comprising methane, ethane and optionally $C_{3+}$ paraffins, is contacted with an ETS-10 type material at a pressure of from 200 psia to 1200 psia.

In an embodiment of the invention, the mixture comprises primarily methane and ethane.

In an embodiment of the invention, the mixture is a natural gas stream.

Provided is a process for the selective removal of ethane and $C_{3+}$ paraffins from a mixture comprising methane, ethane and $C_{3+}$ paraffins, the process comprising contacting the mixture with an ETS-10 type material at a pressure of at least 200 psia.

In an embodiment of the invention, a mixture comprising methane, ethane and optionally $C_{3+}$ paraffins, is contacted with an ETS-10 type material at a pressure of at least 400 psia. In an embodiment, the mixture is contacted with an ETS-10 type material at pressure of from 400 psia to 1300 psia.

In an embodiment of the invention, a mixture comprising methane, ethane and $C_{3+}$ paraffins, is contacted with an ETS-10 type material at pressure of at least 500 psia. In an embodiment, the mixture is contacted with an ETS-10 type material at pressure of from 500 psia to 1200 psia.

In an embodiment of the invention, the ETS-10 type material is an as-prepared ETS-10 zeolite.

In an embodiment of the invention, the ETS-10 type material is a cationically modified ETS-10 zeolite.

In an embodiment of the invention, the ETS-10 type material is a fully cationically exchanged Na-ETS-10 zeolite.

In an embodiment of the invention, the ETS-10 type material is structurally modified ETS-10 zeolite.

Also provided is a swing adsorption process for separating ethane and optionally $C_{3+}$ paraffins from a mixture comprising methane, ethane and optionally $C_{3+}$ paraffins, the process comprising: i) passing the mixture through an adsorbent bed comprising an ETS-10 type material at a first temperature and a first pressure of at least 200 psia, wherein ethane and, if present, $C_{3+}$ paraffins are selectively adsorbed relative to methane, to give an adsorption effluent stream; ii) recovering a desorption effluent stream from the adsorbent bed by carrying out one or more of the following: a) reducing the pressure in the adsorbent bed to second pressure which is lower than the first pressure; b) increasing the temperature in the adsorbent bed to a second temperature which is higher than the first temperature; wherein the adsorption effluent stream is enriched in methane relative to the mixture and the desorption effluent stream is enriched in ethane and optionally $C_{3+}$ paraffins relative to the mixture.

In an embodiment of the invention, the swing adsorption process is a cycle swing adsorption process.

In an embodiment of the invention, the swing adsorption process separates ethane and $C_{3+}$ paraffins from a mixture which is a natural gas stream.

Provided is a process for separating ethane and optionally $C_{3+}$ paraffins from a mixture comprising methane, ethane and optionally $C_{3+}$ paraffins, the process comprising: i) passing the mixture through an adsorbent bed comprising an ETS-10 type material at a pressure at of at least 200 psia wherein ethane and, if present, $C_{3+}$ paraffins are selectively adsorbed relative to methane, to give an adsorption effluent stream; ii) recovering a desorption effluent stream from the adsorbent bed by contacting the adsorbent bed with water; wherein the adsorption effluent stream is enriched in methane relative to the mixture and the desorption effluent stream is enriched in ethane and optionally $C_{3+}$ paraffins relative to the mixture.

In an embodiment of the invention, the adsorbent bed is regenerated by heating an adsorbent bed comprising an ETS-10 type material, optionally at reduced pressure, to remove adsorbed water.

In a further embodiment, the invention provides a process comprising contacting a feed mixture comprising methane, ethane and at least one $C_{3+}$ paraffin with an adsorption bed comprising an ETS-10 type material, at a specific temperature and pressure, for a number of bed volumes which under the chosen temperature and pressure conditions exceeds the breakthrough volume for ethane but which does not exceed the breakthrough volume for $C_{3+}$ paraffins, said process giving an effluent stream which is enriched in methane and ethane relative to said feed mixture and which is essentially free of $C_{3+}$ paraffins. This process may further comprise a step of contacting the effluent stream which is enriched in methane and ethane with an ETS-10 type material to selectively adsorb ethane. This process may be carried out at a pressure of at least 200 psia.

In a further embodiment, the invention provides a process comprising passing a feed mixture comprising methane, ethane and optionally present $C_{3+}$ paraffins through an adsorption bed comprising an ETS-10 type material, at a specific temperature and pressure, for a number of bed volumes which under the chosen temperature and pressure conditions does not exceed the breakthrough volume for ethane or optionally present $C_{3+}$ paraffins, said process giving an effluent stream enriched in methane relative to said mixture and which is essential free of ethane and $C_{3+}$ paraffins. This process may be carried out at a pressure of at least 200 psia.

DETAILED DESCRIPTION

Figure 1:
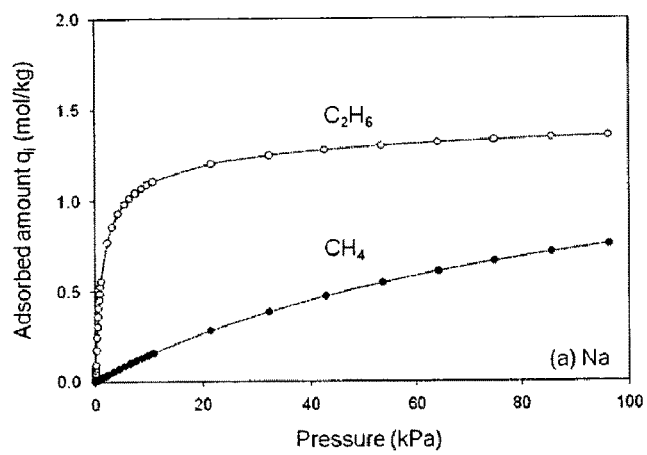
FIG. 1. Ethane (open symbols) and methane (closed symbols) adsorption isotherms at 298 K for three cation-exchanged forms of ETS-10: (a) Na-ETS-10, (b) Ba-ETS-10, (c) Ba/H-ETS-10.
Figure 1:
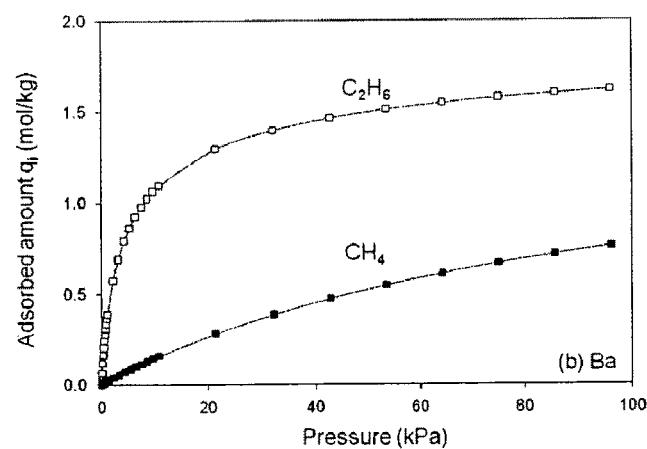
Figure 1:
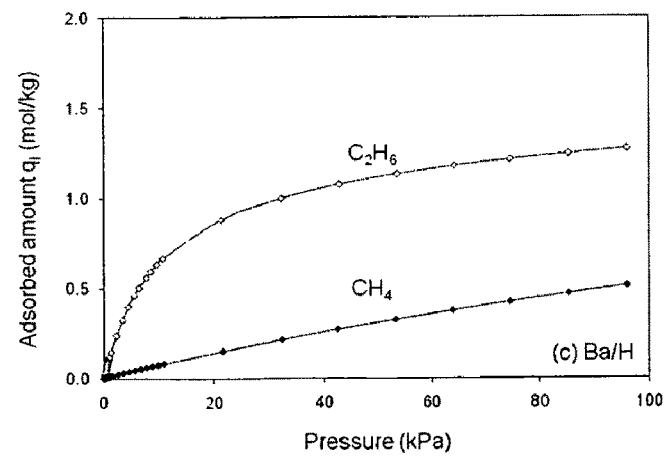

The present invention relates to the use of adsorbents comprising large pore titanium silicate molecular sieves for the separation of ethane (and higher $C_{3+}$ paraffins) from methane.

The current invention contemplates the use of unmodified (i.e. "as-prepared" ETS-10) or modified ETS-10 type materials.

The term "paraffin" or "paraffinic hydrocarbon" as used herein refers to any fully saturated hydrocarbons and includes but is not limited to methane, ethane, propane, n-butane, n-pentane and the like. "Higher paraffins" or "$C_{3+}$ paraffins" or "$C_{3+}$ paraffinic hydrocarbons", as the terms are used herein refer to any fully saturated hydrocarbons which have at least three carbon atoms.

The phrase "a mixture comprising methane, ethane and optionally $C_{3+}$ paraffins" refers to i) a mixture comprising methane, ethane and one or more than one type of $C_{3+}$ paraffin or to ii) a mixture comprising only methane and ethane with no $C_{3+}$ type paraffins present. Generally, the $C_{3+}$ paraffins may be present in a mixture in an amount of from 0 mol % to about 15 mol %.

As used herein terms such as "separate", "separation", "selective removal", "selective adsorption", "sequestration", "selective sequestration" and the like connote a partial or full separation of at least one component from a mixture. Hence at least one component may be completely removed or isolated (i.e. purity of 90% or higher) or merely enriched (i.e. the concentration or proportion of a component in a mixture is increased beyond its initial value) during the process of the current invention. Other terms and phrases such as "enrichment" and "increasing the proportion" respectively, are also meant to connote a partial or full separation of at least one component in a mixture; for example to provide an adsorption effluent stream which is enriched in one or more other components or a desorption effluent stream which is enriched in the at least one component as will be readily appreciated by a person skilled in the art.

As used herein the term "pressure swing capacity" has its conventional meaning and generally refers to the amount (in milimoles per gram, mmol/g) of gaseous component (such as for example, ethane or a higher paraffin) that can be adsorbed on and desorbed from an adsorbent, between a first higher pressure and a second lower pressure respectively. The pressure swing capacity can be reported as the amount of a gaseous component that can be adsorbed and/or desorbed over a given pressure range at a given temperature as indicated by an adsorption isotherm. It will be obvious to a person skilled in the art, that a "swing capacity" for a temperature range (at a given pressure) can be similarly defined.

As used herein, the term "stream" has its conventional meaning and refers to liquid or gaseous mixture which can be a feed, product, recycle or waste stream that can be fed to or received from an adsorbent bed in a swing or cycle swing (for example pressure swing or temperature swing) adsorption process. The terms "adsorption effluent" or "adsorption effluent stream" refer to an effluent stream passing from an adsorbent bed under conditions favoring selective adsorption of a desired component. The terms "desorption effluent" or "desorption effluent stream" refers to an effluent stream passing from an adsorbent bed under conditions favoring release or desorption of a desired component.

As used herein, the term "mixture" refers to a liquid or gaseous mixture or a mixture having gaseous and liquid components. The "mixture" referred to herein will minimally contain methane and ethane as components, but may also contain $C_{3+}$ paraffinic hydrocarbons (i.e. optionally $C_{3+}$ paraffins) as well as other hydrocarbons or polar components. Preferably, the mixture comprises primary methane and ethane (i.e. methane and ethane represent at least 85 mole percent of the mixture). When present in a mixture, the total amount of the one or more $C_{3+}$ paraffins present represent from about 0.1 to about 15 mol % of the mixture. Other species such as for example $CO_2$, $N_2$, etc. may also be present in the mixture and generally comprise less than about 15-20 mol % of the mixture.

The mixture may be a natural gas stream. A natural gas stream can be "lean", "very lean", "typical", "medium rich", "rich" and the like with respect to liquids content as is well known to persons skilled in the art. So called "lean" natural gas has lower molar concentrations of ethane and $C_{3+}$ paraffins in a mixture which comprises mainly methane. So called "rich" natural gas has higher molar concentrations of ethane and $C_{3+}$ paraffins in a mixture which comprises mainly methane. By way of example only, some known natural gas compositions are shown in Table I.

TABLE I (mol %)

| | Very Lean | Typical | Medium Rich | Rich |
|---|---|---|---|---|
| C1 | 98.68643011 | 91.109898 | 86.4 | 80.5092316 |
| C2 | 0.582235918 | 5.329143 | 7.1 | 11.0215387 |
| C3 | 0.019261394 | 1.4813376 | 3.6 | 2.0984616 |
| IC4 | 0 | 0.1562452 | 0.3 | 0.1015385 |
| NC4 | 0 | 0.2119068 | 0.4 | 0.1046154 |
| IC5 | 0 | 0.0496 | 0.04 | 0.0169231 |
| NC5 | 0 | 0.0377576 | 0.04 | 0.0092308 |
| C6+ | 0 | 0.041262 | 0.02 | |
| N2 | 0.559950462 | 0.576802 | 0.6 | 3.133846 |
| CO2 | 0.152122114 | 1.006047 | 1.5 | 2.8753846 |
| HE | 0 | 0 | 0 | 0.1292308 |
| Total | 100 | 99.9999992 | 100 | 100.0000011 |

In the current invention, ethane and, if present, higher paraffins ($C_{3+}$ paraffins) are selectively adsorbed from a mixture of methane, ethane and optionally present $C_{3+}$ paraffins using an ETS-10 type material as an adsorbent.

In one embodiment of the invention a mixture comprising essentially methane and ethane (i.e. methane and ethane make up at least 99 mole percent of the mixture) is put in contact with an ETS-10 type material.

In another embodiment of the invention a mixture comprising methane, ethane and $C_{3+}$ paraffins, where such a mixture is for example a natural gas stream, is put in contact with an ETS-10 type material.

A natural gas stream can have many different compositions as discussed above, but will generally contain from about 70 to 99 mol % of methane, from about 0.1 to about 15 mol % of ethane, from about 0.1 to about 10 mol % of $C_{3+}$ hydrocarbons (mainly paraffinic hydrocarbons) and from about 0.1 to about 20 mol % of $CO_2$ and $N_2$.

The terms "ETS-10", "ETS-10 zeolite", "ETS-10 type material" or "ETS-10 materials" are used to connote large pore titanosilicates in general and can connote either as-prepared ETS-10 or modified ETS-10 materials.

As used herein, the term "pore diameter" refers to the effective diameter of the largest gas molecule that can be significantly adsorbed by the ETS-10 zeolite materials. This may be similar to, but different from the crystallographically determined pore diameter of the ETS-10 zeolite material.

As used herein, the term "modified" encompasses cationic modification and structural modification (or structural variation) of an as-prepared ETS-10 zeolite.

As used herein the term "cationic modifier" represents a cation, typically delivered in the form of a salt or acid, which when added to an unmodified ETS-10 zeolite, provides a modified ETS-10 zeolite through cation exchange reactions.

As used herein the term "structural modifier" represents a compound, which when added to an unmodified ETS-10 zeolite, provides a modified ETS-10 zeolite through substitutions of Ti and/or Si sites or through extraction of a portion of the titanium present. Structural modifiers can also be added during the synthesis of an unmodified ETS-10 to give a modified ETS-10 zeolite.

Unmodified or "as-prepared" ETS-10 zeolites mainly contain $Na^+$ as exchangeable counter-ions but may, depending on preparation conditions, also contain exchangeable $K^+$ counter-ions. The unmodified titanium silicate molecular sieves of the current invention have octahedral titanium sites and tetrahedral silicon sites, providing a structure with an average pore diameter of approximately 8 Å and a titania/silica molar ratio of from 2.5 to 25. A non-limiting description of unmodified ETS-10 zeolites is given in Table 1 of *J. Chem. Eng. Data.* 2005, 50, p 843 by Al-Baghli et al. which is incorporated herein by reference.

The "modified" ETS-10 titanium silicates are derived from "as-prepared" or unmodified ETS-10 zeolites through cation exchange reactions and/or structural exchange reactions. Alternatively, modified ETS-10 zeolites may be obtained by manipulation of the preparative recipe and conditions used for making unmodified (i.e. "as prepared") ETS-10. All such modifications are contemplated by the current invention, provided that the modified ETS-10 zeolite remains selective for the adsorption of ethane over methane.

In the current invention, the terms "modified" or "modified ETS-10 zeolite" connote an ETS-10 zeolite in which at least some of the exchangeable $Na^+$ and/or $K^+$ ions originally present in the zeolite are replaced by other cationic species by cationic exchange reactions. Such modifications are "cationic modification(s)". The terms "modified" or "modified ETS-10 zeolite" also connote a titanium silicate zeolite which differs from an as-prepared ETS-10 zeolite by one or more substitutions at the octahedral titanium sites or the tetrahedral silicon sites (i.e. a structural variant of ETS-10 in which a partial exchange of Ti and/or Si has occurred). Such Ti and/or Si substitutions are structural in nature and for the purposes of the current invention are designated "structural modification(s)". Hence, in the current invention, the terms "modified" or "modified ETS-10 zeolites" includes ETS-10 zeolites that have either or both of:

i) substitution of exchangeable cations (e.g. $Na^+$ and/or $K^+$ sites);

ii) substitution at the titanium and/or silicon sites.

By way of non-limiting example, an "as-prepared" Na/K-ETS-10 can be cationically modified by stirring the Na/K-ETS-10 zeolite with a suitable cation source, to exchange some of the exchangeable cations originally present in the Na/K-ETS-10.

Structural variations to the Ti or Si sites of Na/K-ETS-10 can be achieved by modifying or changing the source components used to make the Na/K-ETS-10. Structural modification can also be achieved though use of exchange reactions where the Ti and/or Si sites of "as-prepared" Na/K-ETS-10 are substituted by suitable metal species, after the Na/K-ETS- 10 material is isolated. Both types of structural modification are known in the art and are discussed in U.S. Pat. Nos. 5,244,650 and 5,208,006.

Members of the ETS-10 molecular sieve zeolite type have a crystalline structure and an X-ray powder diffraction pattern with significant lines at or near those disclosed in Table 1 of U.S. Pat. No. 5,011,591, the entirety of which is incorporated herein by reference. By "near" it is meant that the major lines can shift, on modification of Na-ETS-10, by as much as 1 unit or more, but will maintain essentially the same pattern in an X-ray powder diffraction pattern. For example, such shifting may be seen when aluminum is incorporated into the ETS-10 framework to make ETas-10 (see: U.S. Pat. No. 5,244,650) or when other atoms are integrated into the framework to make related materials (see U.S. Pat. No. 5,208,006). Hence, modified ETS-10 zeolites will have substantially the same pattern of major lines in an X-ray powder diffraction pattern as unmodified Na/K-ETS-10.

As-prepared ETS-10 zeolites can be prepared by mixing a source of silica (e.g. silica; silica hydrosol; silica gel; silicic acid; alkoxides of silicon; alkali metal silicates such as but not limited to sodium and potassium silicate; mixtures thereof and the like); a source of trivalent titanium (e.g. $TiCl_3$ etc.); a base such as but not limited to an alkali metal hydroxide (e.g. NaOH, NaOH(aq), KOH, etc.) for controlling the pH of the reaction mixture at from 9.9 to 10.3±0.1; water; and optionally an alkali metal halide (NaCl, NaF, KF etc.) in specific ratios. In an embodiment of the invention, Na/K-ETS-10 is prepared from a reaction mixture having a composition in terms of molar ratios of:

$SiO_2/Ti$=from about 2 to about 20
$H_2O/SiO_2$=from about 2 to about 100
$M_n/SiO_2$=from about 0.1 to about 10

For further suitable, but non-limiting ratios of these source components see Table 2 of U.S. Pat. No. 5,011,591 that is incorporated herein by reference. The mixture is typically heated to a temperature of between 100° C. and 200° C. and stirred for at least 8 hrs. The "as-prepared" Na/K-ETS-10 zeolite forms as crystals within the reaction mixture. Stirring of the reaction mixture is beneficial but in some cases is optional, especially when using silica gel as the source of silica. The crystals are separated by filtration and optionally washed with water, followed by drying at temperatures of up to about 250° C. for up to about 72 hrs.

In an embodiment of the invention, the "as-prepared" or unmodified ETS-10 is a zeolite prepared according to Examples 5, 6, 7 or 9 of U.S. Pat. No. 5,011,591.

In an embodiment of the invention, unmodified ETS-10 zeolite is prepared and isolated prior to modification by cation exchange reactions or structural substitution reactions.

Both "as-prepared" and "cationically modified" ETS-10 zeolites have a composition that in some embodiments of the invention may be represented by the following formula:

$$xM_{2/n}O:TiO_2:ySiO_2:zH_2O,$$

where M is a mono-, di-, or tri-valent cationic ion, n is the valence of M, x is from 1 to 10, y is from 2.5 to 25, and z is from 0 to 150. In "as-prepared" or unmodified titanium silicate, M is sodium and/or potassium. In cationically modified ETS-10, sodium and/or potassium ions are ion exchanged for at least one cation not originally present in the "as-prepared" or unmodified titanium silicate. Alternatively, in cationically modified ETS-10 zeolites, the $Na^+$ ions of "as prepared" ETS-10 can be fully replaced with $K^+$ ions to give fully exchanged K-ETS-10 or if present in "as prepared" ETS-10, the $K^+$ ions can be fully replaced by $Na^+$ to give fully exchanged Na-ETS-10.

The cation exchange capacity (CEC) is a measure of the exchangeable cations present in an ETS-10 zeolite. It can be measured in SI units as the positive charge (in coulombs) absorbed by the zeolite per unit of mass of the zeolite. It is also conveniently measured in milliequivalence per gram of zeolite (meq/g) or per 100 gram of zeolite (meq/100 g). The cation exchange capacity of the unmodified zeolites is not specifically defined, but in one embodiment of the invention the CEC can be at least 50 milliequivalence per 100 g. In another embodiment of the invention, the unmodified zeolite can have a CEC of from about 1.0 to about 10 meq/g.

The percentage of ions exchanged during the formation of the cationically modified ETS-10 zeolite is not specifically defined, provided that the adsorbent remains selective for the adsorption of ethane over methane after ion exchange. By way of a non-limiting example, from about 5% to 100% of the exchangeable $Na^+$ and/or $K^+$ ions originally present in the "as-prepared" ETS-10 may be exchanged by cation exchange.

In an embodiment of the invention, the amount of cation added to the unmodified ETS-10 can be from about 1% to about 1000% of the cationic exchange capacity of the zeolite, preferably from about 25% to about 250%. One or more than one type of cationic modifier can be added to unmodified ETS-10. For example, a first cationic modifier may be added by treating an as-prepared ETS-10 zeolite with a cation in concentrations (meq/g) below the CEC of the zeolite, followed by the addition of a second, third, or fourth etc. cationic modifier to replace some or all of the remaining exchangeable $Na^+$ and $K^+$ sites. Cationic exchange can involve sequential or simultaneous addition of one or more of the same or different cationic modifiers to an unmodified ETS-10 zeolite.

In the current invention, modification can include partial or full replacement of exchangeable $Na^+$ and/or $K^+$ ions for one or more than one mono, di- or tri-valent cation or mixtures thereof. Modification can also include partial or complete replacement of exchangeable $Na^+$ ions for $K^+$ or $K^+$ ions for $Na^+$ ions. For example, the ETS-10 type material can be a fully cationically exchanged Na-ETS-10 zeolite.

In an embodiment of the invention, the modified ETS-10 zeolite is an "as-prepared" ETS-10 zeolite that has been cation exchanged with a mono, di- or tri-valent cation or mixtures thereof. Either or both of $Na^+$ or $K^+$ may be ion exchanged for a mono-, di- or tri-valent cation.

In an embodiment of the invention, the mono-, di- and tri-valent cations are selected from the group 2-4 metals, a proton, ammonium compounds and mixtures thereof.

Some specific non-limiting examples of mono-, di, or tri-valent cations that can be used in the current invention include, $Li^+$, $K^+$, $Cs^+$, $Mg^{2+}$, $Ca^{2+}$, $Sr^{2+}$, $Ba^{2+}$, $Sc^{3+}$, $Y^{3+}$, $La^{3+}$, $Cu^{2+}$, $Zn^{2+}$, $Cd^{2+}$, $Ag^+$, $Au^+$, $H^+$, $NH_4^+$, and $NR_4^+$ where R is an alkyl, aryl, alkylaryl, or arylalkyl group.

The cationic modifiers are generally added to unmodified Na-ETS-10 in the form of a salt or an acid. The anionic counter-ion associated with the cationic modifier is not specifically defined, provided that it does not adversely affect the modification (i.e. cation exchange) reactions. Suitable anions include but are not limited to acetate, carboxylate, benzoate, bromate, chlorate, perchlorate, chorite, citrate, nitrate, nitrite, sulfates, halide (F, Cl, Br, I) and mixtures thereof. Suitable acids include inorganic and organic acids, with inorganic acids being preferred.

The Na/K-ETS-10 "as prepared" zeolite may be cation exchanged by any of the known conventional techniques. For example, unmodified ETS-10 zeolite may be cation exchanged by treatment with a cationic modifier in a stirred aqueous solution. After the cation exchange reactions are carried out the resulting modified ETS-10 zeolites can be treated in any conventional manner, including but not limited to washing and drying steps as well as calcination and granulation steps.

In an embodiment of the invention, the modified ETS-10 zeolite is an "as-prepared" ETS-10 zeolite that has been structurally modified. Either or both of Ti and Si may be substituted by an octahedral metal and tetrahedral metal, respectively.

In an embodiment of the invention, titanium is partially substituted by an octahedral metal selected from the group consisting of but not limited to arsenic, cobalt, chromium, copper, iron, germanium, hafnium, magnesium, manganese, molybdenum, niobium, nickel, antimony, tin, uranium, vanadium, yttrium, zinc, zirconium, lanthanum, an actinide, a lanthanide and mixtures thereof.

In an embodiment of the invention, silicon is partially substituted by a tetrahedral metal selected from the group consisting of but not limited to aluminum, arsenic, bismuth, boron, beryllium, cobalt, chromium, copper, iron, gallium, germanium, indium, lead, magnesium, manganese, molybdenum, niobium, nickel, antimony, tin, titanium, vanadium, tungsten, zinc and mixtures thereof.

Structurally modified ETS-10 zeolites have a composition that in some embodiments of the invention may be represented by the following formula:

$$a(1.0\pm0.25)M_{2/n}O:AO_\alpha:dBO_\beta:0\text{-}100H_2O,$$

where M is at least one cation of valence n; $\alpha$ is ½ the valence of A; $\beta$ is ½ the valence of B; d is 2-100; a is equal to ½ the charge provided by the total of A and B; A is octahedrally coordinated titanium alone or a mixture of octahedrally coordinated titanium and another octahedrally coordinated metal; B is silicon alone or a mixture of silicon and another tetrahedrally coordinated metal; provided that when A is only titanium, B cannot be only silicon and that when B is only Si, A cannot be only Ti.

In an embodiment of the invention, structurally modified ETS-10 zeolites are crystalline molecular sieves having a pore size of at least 8 Angstrom units.

In an embodiment of the invention, A is titanium alone or a mixture of titanium and another metal selected from the group consisting of but not limited to arsenic, cobalt, chromium, copper, iron, germanium, hafnium, magnesium, manganese, molybdenum, niobium, nickel, antimony, tin, uranium, vanadium, yttrium, zinc, zirconium, lanthanum, an actinide, a lanthanide and mixtures thereof.

In an embodiment of the invention, B is silicon alone or a mixture of silicon and another metal selected from the group consisting of but not limited to aluminum, arsenic, bismuth, boron, beryllium, cobalt, chromium, copper, iron, gallium, germanium, indium, lead, magnesium, manganese, molybdenum, niobium, nickel, antimony, tin, titanium, vanadium, tungsten, zinc, and mixtures thereof.

The Na/K-ETS-10 zeolite may be structurally modified by any of the known techniques that are described in for example, U.S. Pat. Nos. 5,208,006 and 5,244,650, which are incorporated herein by reference. For example, the structurally modified molecular sieves may be prepared from a reaction mixture containing a source of titanium or titanium and at least one other metal capable of being octahedrally coordinated and also containing a source of silicon or silicon and at least one other metal capable of being tetrahedrally coordinated in the framework structure, a source of alkalinity such as an alkali or alkaline earth metal hydroxide, water and, optionally, an alkali or alkaline earth metal salt.

In an embodiment of the invention, a structurally modified ETS-10 zeolite is prepared from a reaction mixture having a composition in terms of molar ratios of:
B/A=from about 1 to about 200
$H_2O$/B=from about 1 to about 100
$M_n$/A=from about 1 to about 100
wherein M indicates the cations of valence n derived from the alkali or earth metal and metal salts, and A and B are defined as above.

In an embodiment of the invention, a structurally modified ETS-10 zeolite is prepared from a reaction mixture having a composition in terms of molar ratios of:
$SiO_2$/Al=from about 1 to about 200
$SiO_2$/Ti=from about 2 to about 20
$H_2O$/$SiO_2$=from about 2 to about 100
$M_n$/$SiO_2$=from about 0.1 to about 20
wherein M indicates the cations of valence n derived from the alkali or earth metal and metal salts. Such, aluminum modified ETS-10 zeolites have been dubbed, ETas-10 zeolites (see U.S. Pat. No. 5,244,650).

The Na/K-ETS-10 may also be modified by adding a source of metal which is capable of being octahedrally or tetrahedrally coordinated within the titanosilicate framework structure, to a previously prepared Na/K-ETS-10. By way of non-limiting example, a source of aluminum (e.g. $AlCl_3.6H_2O$) may be added to previously prepared Na-ETS-10 to exchange silicon for aluminum, which is described in U.S. Pat. No. 5,244,650 (see especially Examples 1-7) that is incorporated herein by reference. The source of metal which is capable of being octahedrally or tetrahedrally coordinated in the framework structure may be stirred and heated with the "as-prepared" Na/K-ETS-10 in the presence or absence of solvent or water to effect Ti and/or Si substitution. Other well known methods for mixing zeolites with additive compounds may also be used.

The current invention also contemplates modifications that remove (i.e. extract) a portion of the titanium from an "as-prepared" Na/K-ETS-10, provided that the framework structure of the Na/K-ETS-10 remains intact and that the zeolite remains selective for ethane adsorption. Methods to remove titanium from an ETS-10 type zeolite are described in U.S. Pat. No. 5,906,954 and include treating the zeolite with complexing agents such as but not limited to ethylene diamine tetraacetic acid, oxalic acid and citric acid, amines, hydroxyl carboxylates and beta diketones.

In an embodiment of the invention, the modified ETS-10 zeolite is an "as-prepared" ETS-10 zeolite that has been both cationically modified and structurally modified.

The ETS-10 zeolites used in the current invention can be used in a wide variety of forms. For example, the modified ETS-10 zeolites may be in the form of a powder, a granule, an extrudate or other particulate form suitable for use in an adsorbent bed. The ETS-10 zeolites can be mixed with other components prior to use as an adsorbent, most typically in an adsorbent bed. For example, natural or synthetic clays, aluminophosphates, agglomerates of clay and silica, silica or other metal oxides, and mixtures thereof may be added to the ETS-10 zeolites.

In the present invention, there is preferably at least one adsorption step where a feedstream comprising methane, ethane and optionally $C_{3+}$ paraffins (the "mixture") is contacted with an ETS-10 adsorbent material at a pressure of at least 200 psia.

During adsorption, a mixture (which can be designated a feedstream) contacts the ETS-10 adsorbent material at a specific pressure and temperature, and as the feedstream flows through the adsorbent material, at least a portion of the ethane, and if present a portion of the $C_{3+}$ paraffins, are adsorbed on the ETS-10 material. Hence, the ETS-10 materials preferentially adsorb ethane and optionally present $C_{3+}$ paraffins, relative to methane from the feedstream. During the adsorption step, an effluent stream, enriched in methane is generated (i.e. the "adsorption effluent stream"). Correspondingly, the effluent stream (i.e. the "adsorption effluent stream") will have a lower molar concentration of ethane and optionally $C_{3+}$ paraffins than the feedstream.

The adsorption step described above may be part of a swing adsorption process. A swing adsorption process also employs at least one desorption step where ethane and optionally $C_{3+}$ paraffins which were preferentially adsorbed by the ETS-10 material are recovered in a desorbed stream (i.e. a "desorption effluent stream") which is enriched in ethane and optionally $C_{3+}$ paraffins. Hence, the desorbed stream will have a lower molar concentration of methane than the feedstream. During the desorption step, the process conditions are changed to allow at least a potion of ethane (and optionally $C_{3+}$ paraffins) to be desorbed from the ETS-10 material and recovered as a desorbed effluent stream (or "product stream"). The desorption can be induced by reducing the pressure and/or increasing the temperature relative to the pressure and temperature used during the adsorption step. Additionally, a purge stream may be used, optionally in combination with reducing the pressure and/or increasing the temperature to displace adsorbed ethane and, if present, $C_{3+}$ paraffins.

Desorption steps may also use unconventional methods such as the addition of water for example in the form of steam, or use of microwave radiation to assist in the desorption of ethane and/or higher paraffins from the ETS-10 zeolite material. For the use of microwave radiation and water in hydrocarbon desorption processes, see U.S. Pat. No. 4,322,394 and U.S. Pat. Appl. No. 2005/0203327A1 respectively, both of which are incorporated by reference herein in their entirety.

In an embodiment of the invention, ethane and optionally $C_{3+}$ paraffins are displaced from an adsorbent bed comprising an ETS-10 material by passage of water though the adsorption bed.

In an embodiment of the invention, ethane and optionally $C_{3+}$ paraffins are displaced from an adsorbent bed comprising an ETS-10 material by passage of steam though the adsorption bed.

In an embodiment of the invention, ethane and optionally $C_{3+}$ paraffins are recovered from an adsorbent bed by increasing the bed temperature (relative to the temperature used during adsorption) with microwave radiation, optionally in combination with reducing the pressure (relative to the pressure used during the adsorption).

Where an adsorbent bed comprising ETS-10 material is contacted with water, the water may be subsequently removed in one or more bed regeneration steps which comprise heating the adsorption bed, optionally at reduced pressure. Purge streams may also be used, optionally in combination with reducing the pressure and/or increasing the temperature to displace adsorbed water. Microwave radiation may also be used to heat the adsorption bed in order to remove water.

In an embodiment of the invention, the ETS-10 materials are used in a cycle swing adsorption process. Cycle swing adsorption processes may be used to separate ethane and, if present, $C_{3+}$ paraffins from methane in mixtures comprising methane, ethane and optionally $C_{3+}$ paraffins or to separate ethane and at least one $C_{3+}$ paraffin from a natural gas stream. A cycle swing adsorption process typically comprises a number of steps, but will include at least one adsorption step and at least one desorption step which are repeated. Multiple adsorbent beds are often used. A complete swing adsorption cycle on a particular adsorbent bed, comprises all the adsorption and desorption steps, and typically begins when a mixture is first contacted with an adsorbent bed which is free from adsorbed components. Such a cycle may end when the last desorption stage is reached during which or after which the adsorbent bed is regenerated for another cycle. Such regeneration may include additional repressurizing or purging steps that may bring the cycle back to the initial adsorbent free adsorbent bed conditions which began the cycle. Following this, the next swing adsorption cycle can begin and the cycle can be repeated many times.

The ETS-10 zeolites can be used with any cycle swing adsorption process for the separation/enrichment of binary or multi-component mixtures comprising at least methane and ethane but which may also comprise $C_{3+}$ paraffins. Preferably, the process includes an adsorption step at a pressure of at least 200 psia to selectively adsorb ethane (and optionally $C_{3+}$ paraffins) from a mixture comprising methane, ethane (and optionally $C_{3+}$ paraffins). For example, pressure swing adsorption (PSA) processes including vacuum swing adsorption (VSA), thermal swing adsorption (TSA) processes and combinations thereof can be used. The cycle swing adsorption process can comprise multiple adsorption and regeneration steps as well as purging and depressurization steps. Pressure swing and temperature swing processes are well known in the art.

In the present invention, the adsorbent bed comprises an ETS-10 material which is selective for ethane and, if present, $C_{3+}$ paraffinic hydrocarbons relative to methane. During passage of a mixture comprising methane, ethane and optionally $C_{3+}$ paraffins through an ETS-10 adsorbent bed, an effluent stream which has a reduced concentration of ethane and optionally $C_{3+}$ paraffins is obtained.

Pressure swing adsorption can include, in addition to adsorption and regeneration steps: purge steps, venting steps, pressure equalization steps, evacuation steps, and blowdown steps. Steps can be carried out in concurrent, alternating or sequential fashion and gas flows can be continuous, discontinuous, co-current and counter-current, all of which are well known in the art. In a PSA process one or more adsorbent beds can be arranged in series or in parallel. Some non-limiting examples of PSA processes are described in *Adsorption, Gas Separation* in the Kirk-Othmer Encyclopedia of Chemical Technology, Copyright John Wiley & Sons, Inc. vol 1, pgs 642-647 and references cited therein as well as in U.S. Pat. Nos. 3,430,418; 4,589,888; 6,293,999; 6,197,092 and 6,497,750 all of which are incorporated herein by reference.

In the PSA process the partial pressure of ethane (and optional $C_{3+}$ paraffins) during the adsorption step is higher than the partial pressure of ethane (and optional $C_{3+}$ paraffins) during the desorption step which allows at least a portion of the ethane (and optional $C_{3+}$ paraffins) to be recovered in the desorption step and the adsorbent material to be regenerated by depletion of the adsorbed ethane (and optional $C_{3+}$ paraffins) for re-use in a subsequent adsorption step. This is accomplished in part by exposing the adsorbent material to lower partial pressure conditions in the desorption step relative to the adsorption step. This desorption step can be further assisted by utilizing a purge gas (i.e. a pressure displacement process) to lower the partial pressure of the ethane (and optional $C_{3+}$ paraffins) during desorption.

Temperature swing adsorption (TSA) is described in Adsorption, Gas Separation in the Kirk-Othmer Encyclopedia of Chemical Technology, Copyright John Wiley & Sons, Inc. vol 1, pgs 636-642 and references cited therein all of which are incorporated herein by reference. In a temperature swing adsorption process, a mixture (i.e. a feedstream) containing components to be separated is passed through an adsorbent bed comprising an adsorbent material where one or more components are preferential adsorbed over one or more other components. In a TSA process, once the adsorbent material (i.e. ETS-10) has adsorbed a certain amount of ethane (and optionally $C_{3+}$ paraffins), the temperature of the adsorbent material is increased and the preferentially adsorbed components are desorbed and can be recovered. Hence, the desorbed stream will have an increased concentration of ethane (and optionally $C_{3+}$ paraffins) relative to the feedstream. By cyclically swinging the temperature of the adsorbent bed between a first lower temperature used for adsorption and a second higher temperature used for desorption, TSA processes can be used to separate and recover desired components from a mixture which enters the adsorbent bed as a feedstream.

The above pressure swing and temperature swing adsorption process may be combined in a cycle swing process. For example, a combined PSA/TSA process may involve increasing the temperature of the adsorbent material during the lower pressure or lower pressure purge step of a conventional PSA process to improve the desorption and recovery of preferentially adsorbed components. Additionally, the adsorbent temperature may be decreased during the adsorption step in a PSA cycle to increase the proportion of selectively adsorbed component or to alter the adsorption capacity of the adsorbent material.

In an embodiment of the present invention, at least one ETS-10 containing adsorbent bed is used in a pressure swing adsorption process to separate ethane and $C_{3+}$ paraffinic hydrocarbons from mixtures of methane, ethane and $C_{3+}$ paraffinic hydrocarbons.

In an embodiment of the present invention, at least one ETS-10 containing adsorbent bed is used in a combined pressure swing/temperature swing adsorption process to separate ethane and $C_{3+}$ paraffinic hydrocarbons from mixtures of methane, ethane and $C_{3+}$ paraffinic hydrocarbons.

In an embodiment of the present invention, at least one ETS-10 containing adsorbent bed is used in a pressure swing adsorption process to separate ethane from mixtures of methane and ethane.

In an embodiment of the present invention, at least one ETS-10 containing adsorbent bed is used in a combined pressure swing/temperature swing adsorption process to separate ethane from mixtures of methane and ethane.

In an embodiment of the present invention, at least one ETS-10 containing adsorbent bed is used in a pressure swing adsorption process to separate ethane and at least one $C_{3+}$ paraffin from natural gas.

In an embodiment of the present invention, at least one ETS-10 containing adsorbent bed is used in a combined pressure swing/temperature swing adsorption process to separate ethane and at least one $C_{3+}$ paraffin from natural gas.

In the present invention, the preferred adsorption pressures used will be at or above 200 psia (1379 kPa). By way of example, the adsorption pressures used can be from about 200 psia to about 2015 psia. The actual pressure at which adsorption steps are carried will depend on a number of factors such as but not limited to the temperature used, the type of cation used to modify the ETS-10 zeolite (when optional cationic modification is carried out), the type of structural modification of the ETS-10 zeolite (when optional structural modification is carried out), and the nature of the mixture. In an embodiment of the invention, the adsorption pressure can be from about 200 psia to about 1500 psia (including all the pressures between 200 psia and 1500 psia). Hence, the adsorption pressure can be from about 200 psia to about 1200 psia or from about 200 psia to about 1000 psia or from about 200 psia to about 900 psia. In another embodiment of the invention, the adsorption pressure is at least 400 psia. In another embodiment of the invention, the adsorption pressure can be in the range of from about 400 psia to about 1300 psia (including all the pressures between 400 psia and 1300 psia). In yet another embodiment of the invention, the adsorption pressure is at least 500 psia. In yet another embodiment of the invention, the adsorption pressure can be in the range of from about 500 psia to about 1200 psia (including all the pressures between 500 psia and 1200 psia). In a further embodiment of the invention, the adsorption pressure is at least 600 psia. In a further embodiment of the invention, the adsorption pressure can be in the range of from about 600 psia to about 1200 psia (including all the pressures between 600 psia and 1200 psia). In a further embodiment of the invention, the adsorption pressure is at least 700 psia. In a further embodiment of the invention, the adsorption pressure can be in the range of from about 700 psia to about 1200 psia (including all the pressures between 700 psia and 1200 psia). In a further embodiment of the invention, the adsorption pressure is at least 800 psia. In a further embodiment of the invention, the adsorption pressure can be in the range of from about 800 psia to about 1200 psia (including all the pressures between 800 psia and 1200 psia).

Without wishing to be bound by theory, pressures of between about 400 psia and about 1400 psia are often employed for natural gas pipeline pressures and associated peripheral pipeline pressures, where application of the current invention may be particularly advantageous.

Pressures employed during desorption (or regeneration) steps are not specifically defined, and depend on a number of factors such as but not limited to the temperature used, the type of cation used to modify the ETS-10 zeolite (when optional cationic modification is carried out), and the type of structural modification of the ETS-10 zeolite (when optional structural modification is carried out). By way of example only, desorption pressures may be from about 14.7 to about 200 psia or desorption pressures may be vacuum pressures of below 14.7 psia.

In an embodiment of the invention, desorption occurs at pressures of from about 14.7 psia to 200 psia. In an embodiment of the invention, desorption occurs at pressures of from about 14.7 psia to 150 psia. In an embodiment of the invention, desorption occurs at pressures of from about 14.7 psia to 100 psia. In an embodiment of the invention, desorption occurs at pressures of from about 14.7 psia to 50 psia.

In an embodiment of the invention, desorption occurs at vacuum pressures of below 14.7 psia.

The temperatures at which the adsorption and desorption steps take place are not specifically defined and will depend on a number of factors, such as but not limited to the type of ETS-10 material used and the pressure at which adsorption and desorption are to be carried out. In general, an adsorption or desorption step can be carried out at from ambient temperatures or from below ambient temperatures to well above about 100° C., provided that the temperatures do not exceed temperatures at which chemical reaction/decomposition of the paraffins to be separated takes place. For example, temperatures that favor adsorption over a pressure range of about 200 psia to 1500 psia and desorption over a pressure range of about 14.7 psia to about 200 psia or desorption at vacuum pressures (i.e. below 14.7 psia) may be used.

In an embodiment of the current invention, a modified and/or unmodified ETS-10 zeolite is used to selectively adsorb ethane from a gaseous feedstream containing at least methane and ethane at a first temperature and a first pressure of at least 200 psia, to produce an adsorbed phase enriched in ethane and a non-adsorbed phase enriched in methane. Desorption from the modified and/or unmodified ETS-10 zeolite occurs at a second pressure which is lower than the first pressure and/or optionally at a second temperature which is higher than the first temperature, and the gaseous mixture enriched in ethane may be recovered for use as product or again enriched by further contact with modified and/or unmodified ETS-10 zeolite. The feedstream may optionally contain higher hydrocarbons and other gases such as carbon dioxide, oxygen, nitrogen, hydrogen, unsaturated paraffins and the like. Methods to remove hydrogen, hydrogen sulfide, carbon dioxide etc. are well known in the art. Components such as hydrogen sulfide may also be present in the feedstream and are may be removed by known methods prior to contact with the ETS-10 material.

One measure of adsorption bed capacity (or "bed capacity") for a given paraffin, such as ethane, is the breakthrough volume (in terms of number of bed volumes of feed mixture) for that paraffin. Breakthrough volume for a specific paraffinic component is defined as the number of bed volumes of feed mixture at which the adsorption rate decreases dramatically for the specific paraffinic component from the feed stream. Hence, once the breakthrough volume is reached, the paraffin appears in the effluent stream. This occurs when the bed capacity for adsorption of the specific paraffinic component becomes saturated. Once breakthrough volume is reached, the specific paraffinic component will appear in the effluent stream until the bed is regenerated to pre-saturation or initial pre-adsorption conditions. A person skilled in the art will recognize that the breakthrough bed volume for paraffinic components will depend on a number of factors, such as for example feed mixture composition, adsorption isotherm, feed flow rate, temperature, pressure, bed volume, adsorbent density, ETS-10 material specifics and the like, and that a breakthrough curve can be generated for any adsorption bed or beds comprising an ETS-10 type material.

Figure 3:
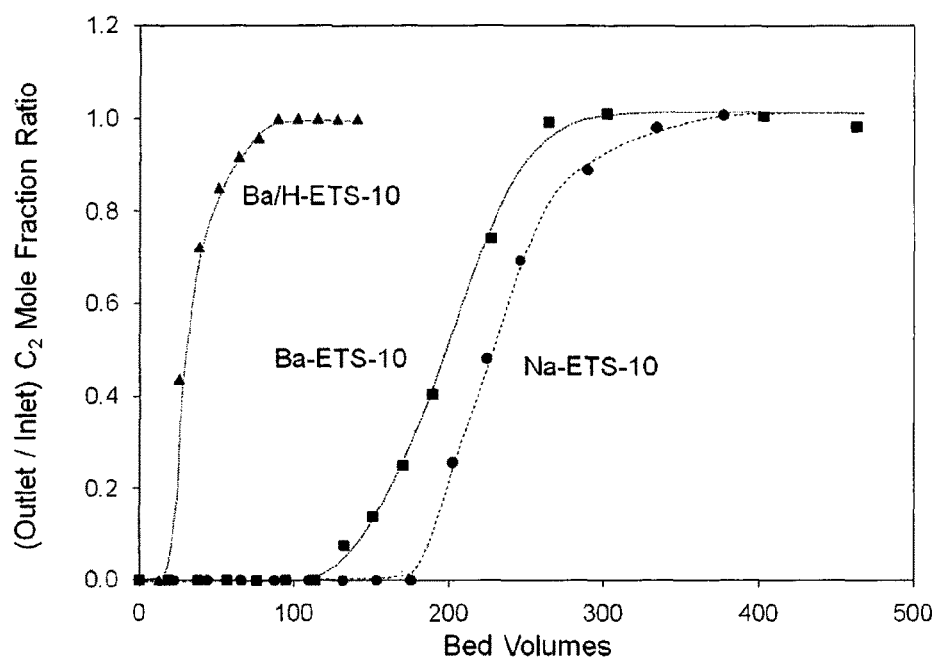
FIG. 3. Ethane breakthrough curves for three cation-exchanged forms of ETS-10 at 298K and 101.3 kPa: Na-ETS-10 (circles), Ba-ETS-10 (squares) and Ba/H-ETS-10 (triangles). Feed gas composition: 90.99 $CH_4$: 5.60 $C_2H_6$: 1.63 $C_3H_8$: 0.69 $CO_2$: 0.50 $N_2$: 0.49 $C_4H_{10}$: 0.10 $C_5H_{12}$. Feed Rate: 170 sccm.

With reference to FIG. 3, three different ETS-10 type materials are shown to provide different capacities for ethane before reaching saturation. For Ba/H-ETS-10, Ba-ETS-10, and Na-ETS-10 the ethane breakthrough volume for similarly packed adsorbent beds under analogous conditions is 13, 114 and 175 bed volumes, respectively, for a simulated natural gas feed mixture. Hence at 298K and 101.3 kPa, Na-ETS-10 has the highest capacity to adsorb ethane before regeneration steps or desorption steps are needed. A person skilled in the art will appreciate that the bed capacity of adsorbent beds comprising an ETS-10 material for different paraffins could be finely tuned through structural or cationic modification of the ETS-10 material used.

Figure 4:
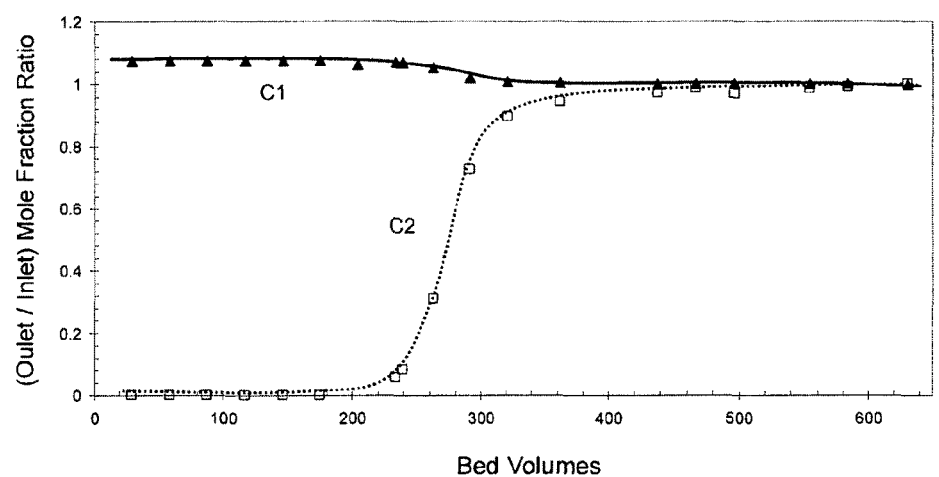
FIG. 4. Breakthrough curves for methane (C1) and ethane (C2) as a function of bed volumes on a fixed bed column composed of Na-ETS-10. Feed mixture: a 93/7 mixture of methane/ethane. Feed rate: 250 sccm. Column temperature: 298 K. Column pressure: 3200 kPa.
Figure 5:
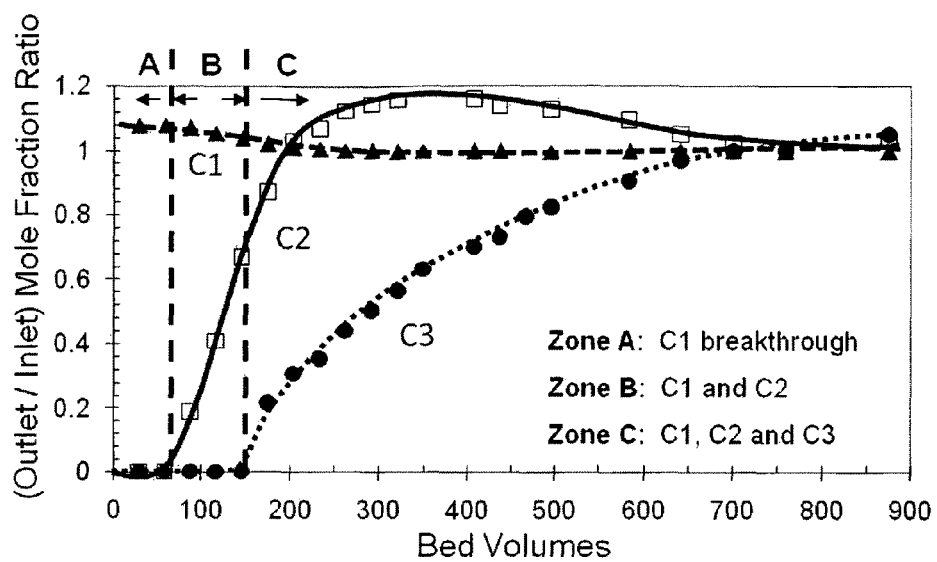
FIG. 5. Breakthrough curves for methane (C1), ethane (C2) and propane (C3) as a function of bed volumes on a fixed bed column composed of Na-ETS-10. Feed gas composition: 90.99 $CH_4$: 5.60 $C_2H_6$: 1.63 $C_3H_8$: 0.69 $CO_2$: 0.50 $N_2$: 0.49 $C_4H_{10}$: 0.10 $C_5H_{12}$. Feed rate: 250 sccm. Column temperature: 298 K. Column pressure: 3200 kPa.

Reference to FIGS. 4 and 5 shows that at 298 K and high pressure (3200 kPa) the breakthrough volume increases as the paraffinic hydrocarbon increases in chain length (C3>C2>C1) when Na-ETS-10 is used as an adsorbent.

In an embodiment of the present invention, an ETS-10 zeolite adsorbent is used to generate a methane effluent stream from a feed mixture comprising methane, ethane and optionally $C_{3+}$ paraffinic hydrocarbons. In this embodiment of the invention, a feed mixture comprising methane, ethane and optionally at least one $C_{3+}$ paraffin is passed through an adsorption bed comprised of an ETS-10 material, for a number of bed volumes (of feed gas mixture) which under the chosen temperature and pressure conditions does not exceed the breakthrough volume (measured as the number of bed volumes of feed gas before breakthrough occurs) for ethane and optionally present $C_{3+}$ paraffins. The specific paraffinic component will appear in the effluent stream unless the bed is regenerated prior to bed saturation. With reference to FIGS. 4 and 5, when the breakthrough volume for the ETS-10 material with respect to ethane and optionally present $C_{3+}$ paraffinic hydrocarbons has not been exceed (as measured in the number of bed volumes), the effluent stream is highly enriched in methane relative to the feed mixture and will be essentially free (i.e. less than about 0.5 mole percent) of ethane or $C_{3+}$ paraffinic hydrocarbons. A person skilled in the art will recognize that the breakthrough bed volume for paraffinic components will depend on a number of factors, such as feed mixture composition, adsorption isotherm, feed flow rate, temperature, pressure, bed volume, adsorbent density, ETS-10 material specifics and the like, and that a breakthrough curve can be generated for any adsorption bed or beds comprising an ETS-10 material.

In an embodiment of the present invention, an ETS-10 zeolite is used to generate an effluent stream comprising methane and ethane from a feed mixture comprising methane, ethane and at least one $C_{3+}$ paraffinic hydrocarbon. In this embodiment of the invention, a feed mixture comprising methane, ethane and at least one $C_{3+}$ paraffin is passed through an adsorption bed comprised of an ETS-10 material, for a number of bed volumes which under the chosen temperature and pressure conditions exceeds the breakthrough volume for ethane but which does not exceed the breakthrough volume for $C_{3+}$ paraffins. With reference to FIG. 5, a process is shown in which the breakthrough volume of an ETS-10 material for various paraffinic hydrocarbons is utilized to effect various separation results. By using different volumes of feed mixture, a person skilled in the art can, for example, generate an effluent stream which contains only the paraffins methane and ethane. The breakthrough concentration curves for various paraffins can be expressed as a function of the number of bed volumes of a feed mixture, such as a natural gas mixture, that flow through the packed bed before ethane or higher paraffins begin to elute from the column. FIG. 5 shows three different zones in the breakthrough curves. In Zone A (up to approximately 60 bed volumes) all hydrocarbons other than methane are completely retained on the adsorbent bed. During this period, the effluent stream is essentially free (i.e. less than about 0.5 mole %) of ethane and $C_{3+}$ paraffinic species. If the feed mixture is a natural gas stream from a natural gas pipeline system, the methane rich stream can be returned to the pipeline system and at analogous pressures after the ethane and $C_{3+}$ paraffins have been removed. This can be done without recompression steps, as the methane rich stream will be at a pressure similar to the feed mixture pressure. In Zone B (approximately 60 to 150 bed volumes) all hydrocarbons other than methane and ethane are completely retained on the adsorbent bed. During this period, the effluent stream is essentially free (i.e. less than about 0.5 mol percent) of $C_{3+}$ paraffinic hydrocarbons. In Zone C (above approximately 150 bed volumes) the effluent stream includes methane, ethane and propane. Similar Zones D, E, etc. may be defined for exclusion of even heavier paraffinic hydrocarbons. The effluent stream obtained in Zone B stream can be further recycled, for example by passage to yet another adsorption bed comprising an ETS-10 material, to further separate ethane by selective adsorption relative to methane. Subsequent desorption would provide an effluent stream which is further enriched in ethane and free from $C_{3+}$ paraffinic hydrocarbons. Similarly, the effluent stream obtained in Zone C could be recycled back into a process node where it is further combined with an ETS-10 material to further separate ethane and $C_{3+}$ paraffinic components by selective adsorption relative to methane. A person skilled in the art will recognize that the breakthrough bed volume for paraffinic components will depend on a number of factors, such feed mixture composition, adsorption isotherm, feed flow rate, the temperature used, the pressure used, the bed volume, the adsorbent density, the specific ETS-10 material used and the like, and that a breakthrough curve can be generated for any adsorption bed or beds comprising an ETS-10 material.

Zone A, B, C effluent streams can be generated using a single adsorption bed or separate adsorption beds, so long as the appropriate breakthrough volumes are not exceeded in order to generate the desired adsorption effluent stream. For example, individual adsorbent beds comprising an ETS-10 material can be used to generate a purified methane stream as the adsorption effluent stream by not exceeding a breakthrough volume for ethane, or an adsorption effluent stream comprising only ethane and methane as paraffins by not exceeding a breakthrough volume for propane, or an adsorption effluent stream comprising ethane, methane and propane as paraffins (see FIG. 5).

Figure 7:
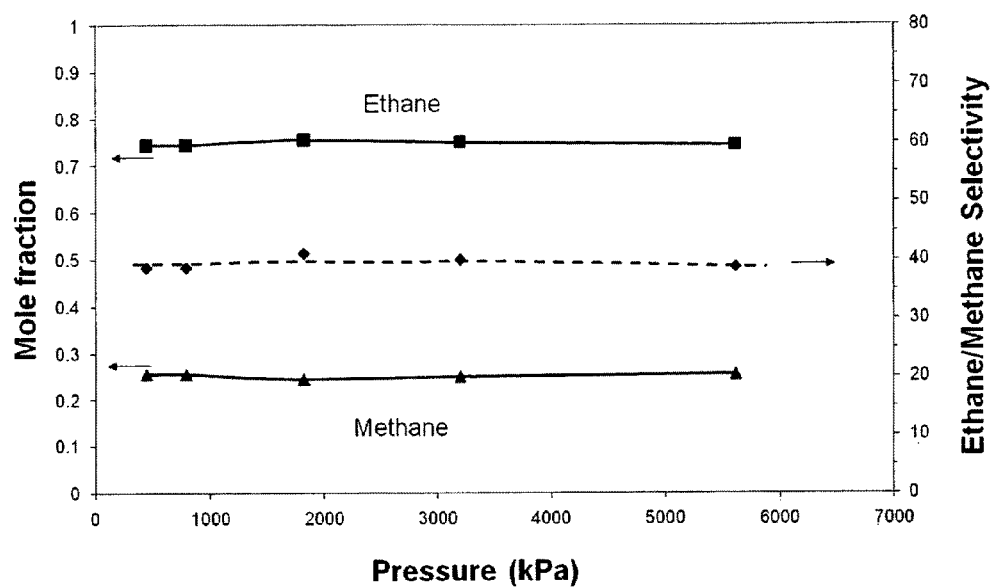
FIG. 7. Mole fractions of methane and ethane (solid lines) and ethane/methane selectivity (dotted line) in a desorbed effluent stream as a function of Na-ETS-10 adsorption column pressure. Feed mixture: 93/7 methane/ethane. Feed rate: 250 sccm. Column temperature: 298 K.

With reference to FIG. 7, a Na-ETS-10 material shows good experimentally observed selectivity for ethane relative to methane at 298K and high pressure (i.e. above 200 psia). The selectivity of the Na-ETS-10 material for ethane from a 93:7 binary mixture of methane and ethane at a pressure above 200 psia and a temperature of 298K is around 40. Experimentally observed separation selectivity for Na-ETS-10 was defined in terms of the extract composition obtained after desorption and the feed mixture fractions as discussed further in the Examples. Selectivity is S, defined by $$S = \frac{X_{C_2}}{X_{C_1}} \Big/ \frac{Y_{C_2}}{Y_{C_1}}$$

where X and Y are the mole fractions in the extract and feed gas, respectively.

In an embodiment of the current invention, an ETS-10 zeolite material has a selectivity for ethane over methane of at least 20 when adsorption of a mixture comprising methane and ethane is carried out at a pressure of at least 200 psia and a temperature of 298K. In an embodiment of the current invention, an ETS-10 zeolite material has an observed selectivity for ethane over methane of at least 20 when adsorption of a mixture comprising methane and ethane is carried out at a pressure of at least 400 psia and a temperature of 298K. In an embodiment of the current invention, an ETS-10 zeolite material has an observed selectivity for ethane over methane of at least 20 when adsorption of a mixture comprising methane and ethane is carried out at a pressure of at least 500 psia and a temperature of 298K. In an embodiment of the current invention, an ETS-10 zeolite material has an observed selectivity for ethane over methane of at least 20 when adsorption of a mixture comprising methane and ethane is carried out at a pressure of at least 600 psia and a temperature of 298K. In an embodiment of the current invention, an ETS-10 zeolite material has an observed selectivity for ethane over methane of at least 20 when adsorption of a mixture comprising methane and ethane is carried out at a pressure of at least 800 psia and a temperature of 298K.

In an embodiment of the current invention, a Na-ETS-10 zeolite material has an observed selectivity for ethane over methane of from about 25 to 55 or from about 30 to 50 when adsorption of a mixture comprising methane and ethane is carried out at a pressure of at least 200 psia and a temperature of 298K. In an embodiment of the current invention, a Na-ETS-10 zeolite material has an observed selectivity for ethane over methane of from about 25 to 55 or from about 30 to 50 when adsorption of a mixture comprising methane and ethane is carried out at a pressure of at least 400 psia and a temperature of 298K. In an embodiment of the current invention, a Na-ETS-10 zeolite material has an observed selectivity for ethane over methane of from about 25 to 55 or from about 30 to 50 when adsorption of a mixture comprising methane and ethane is carried out at a pressure of at least 600 psia and a temperature of 298K. In an embodiment of the current invention, a Na-ETS-10 zeolite material has an observed selectivity for ethane over methane of from about 25 to 55 or from about 30 to 50 when adsorption of a mixture comprising methane and ethane is carried out at a pressure of at least 800 psia and a temperature of 298K.

Figure 9:
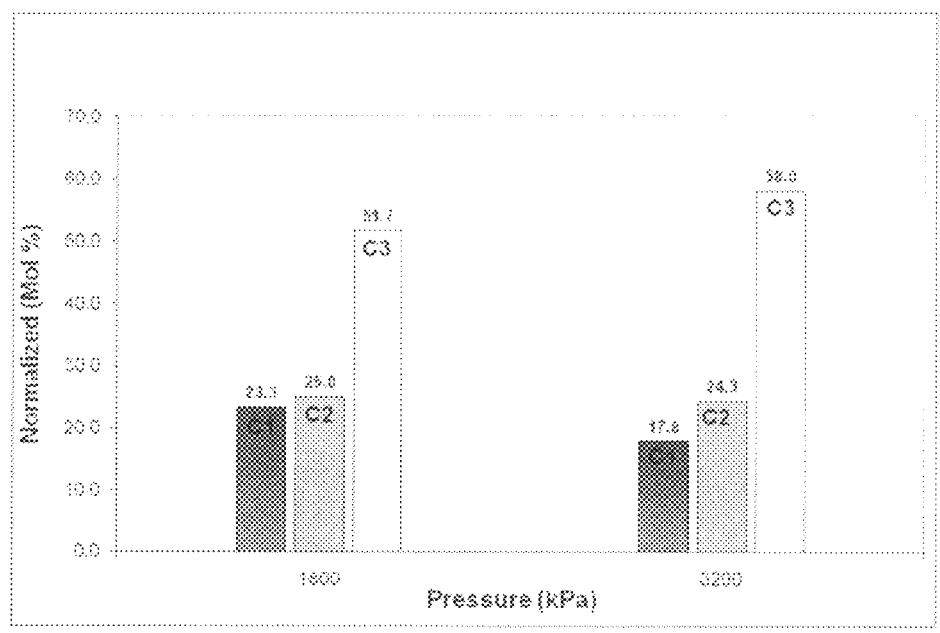
FIG. 9. Fractions of methane (C1), ethane (C2) and propane (C3) in the desorbed effluent stream following steam desorption from a fixed bed column composed of Na-ETS-10. Fractions were desorbed after the column had been exposed to ~850 bed volumes of the feed gas mixture at one of two different column pressures. Feed mixture: 90.99 $CH_4$: 5.60 $C_2H_6$: 1.63 $C_3H_8$: 0.69 $CO_2$: 0.50 $N_2$: 0.49 $C_4H_{10}$: 0.10 $C_5H_{12}$. Feed rate: 250 sccm. Column temperature: 298 K. Column pressures: 1800 or 3200 kPa.

With reference to FIG. 9, as the adsorption pressure increases, the selectivity of Na-ETS-10 for ethane over methane increases. The data in FIG. 9 further demonstrate that an ETS-10 type material shows good adsorption selectivity for ethane and $C_{3+}$ paraffinic hydrocarbons relative to methane at higher pressure, including natural gas pipeline relevant pressures of more than about 400 psia (2760 kPa).

In an embodiment of the current invention, an ETS-10 zeolite material has an observed selectivity for ethane and $C_{3+}$ paraffins over methane which increases with pressure, when adsorption of a mixture comprising methane, ethane and $C_{3+}$ paraffins is carried out at a pressure of at least 200 psia and a temperature of 298K.

In an embodiment of the current invention, a Na-ETS-10 zeolite material has an observed selectivity for ethane and $C_{3+}$ paraffins over methane which increases with pressure, when adsorption of a mixture comprising methane, ethane and $C_{3+}$ paraffins is carried out at a pressure of at least 200 psia and a temperature of 298K.

EXAMPLES

Hydrothermal synthesis of "as prepared" unmodified ETS-10 was carried out as previously described in U.S. Pat. No. 5,011,591. A mixture of 50 g of sodium silicate (28.8% $SiO_2$, 9.14% $Na_2O$, Fisher), 3.2 g of sodium hydroxide (97% NaOH, Fisher), 3.8 g of KF (anhydrous, Fisher), 4 g of HCl (1 M, Fisher), and 16.3 g of $TiCl_3$ solution (Fisher) was stirred in a blender for 1 h. The mixture was then transferred to a Teflon-lined autoclave and reacted for 64 h at 488 K. The product was washed with deionized water and dried at 373 K. Following drying, ETS-10 was reduced to a fine powder (<150 μm; 100 mesh) and total ion exchange was achieved by exposing the molecular sieve to an excess of $BaCl_2$ or NaCl in aqueous solution with stirring for 24 h at 373 K. Fully ion-exchanged Na-ETS-10 and Ba-ETS-10 materials were washed with deionized water and dried at 373 K. The mixed cationic form, Ba/H-ETS-10, was prepared through partial exchange with 6 meq/g of $BaCl_2$ followed by treatment in an HCl solution at pH 6 at 293 K for 16 h. Samples to be used for breakthrough analysis were pelletized by mixing 2.5 g of Ludox HS-40 colloidal silica (Aldrich) with 6 g of dried Na, Ba or Ba/H ETS-10 materials, homogenizing with mortar and pestle, and compressing in a pellet press. The resulting discs were ground and sieved to a 20-50 mesh (297-841 μm).

The ethane and methane adsorption isotherms for Na, Ba and Ba/H ETS-10 species were obtained at 298 K and up to 100 kPa on Autosorb-1 MP volumetric system from Quantachrome Instruments, Boynton Beach, Fla. using a static volumetric method. Na, Ba and Ba/H ETS-10 materials in crystalline powder form (with no added binders or diluents) were dried at 523 K for 12 h under vacuum of greater than $10^4$ Torr prior to adsorption tests.

All pressures herein (including those corresponding to FIGS. 1-5 and 7-9) are reported as absolute pressures unless otherwise indicated. The unit psia is pounds per square inch absolute pressure. The units psig is pounds per square inch gauge pressure. The units kPa is kilopascal.

Theoretical Treatment

The experimental methane and ethane isotherms were fitted to the Langmuir adsorption isotherm (Eq. 1):

$$\frac{q_i}{q_{i,m}} = \frac{b_i P_i}{1+b_i P_i} \quad (1)$$

where $q_i$ for a given sorbate is the amount of hydrocarbon adsorbed on the solid, $P_i$ is the corresponding partial pressure in the gas phase, $q_{i,m}$ represents the saturation or maximum adsorption capacity, and $b_i$ is the equilibrium constant or Langmuir constant. For details on the Langmuir model see "Principles of Adsorption and Adsorption Processes" by Douglas M. Ruthven, Wiley Interscience (John Wiley and Sons) New York 1984 and Al-Baghli et. al. in the *J. Chem. Eng. Data*. 2005, v50, p 843.

The Henry's Law constants $K_i = q_{i,m} b_i$, for ethane and methane were used to calculate the limiting $C_2H_6/CH_4$ selectivity (a) of each adsorbent (Eq. 2).

$$\alpha = \frac{K_{C_2H_6}}{K_{CH_4}}. \quad (2)$$

Example 1

Single Component Adsorption Isotherms: Low Pressure Regime (0-100 kPa)

Methane and ethane single component adsorption isotherms at 298 K and from 0-100 kPa for three forms of ETS-10 (Na-, Ba-, and Ba/H-ETS-10) are shown in FIG. 1. For ethane, the most rectangular isotherm is observed on the Na-ETS-10 material. Ba-ETS-10 and Ba/H-ETS-10 ethane isotherms are progressively less rectangular, indicating weaker adsorptive interactions.

The Langmuir saturation adsorption capacity ($q_{i,m}$) and equilibrium constant ($b_i$), and the Henry's Law constant ($K_i$), were calculated for each gas/adsorbent combination, and are reported in Table 1.

TABLE 1

Adsorption Parameters for Ethane and Methane on ETS-10 Materials at 298 K

| Sorbate | Adsorbent | Saturation Adsorption Capacity $q_{i,m}$ (mol/kg) | Equilibrium Constant $b_i \times 10^2$ (kPa$^{-1}$) | Henry's Law Constant $K_i \times 10^2$ (mol/kg kPa) | Selectivity α ($C_2H_6$/$C_2H_4$) |
|---|---|---|---|---|---|
| $CH_4$ | Na-ETS-10 | 1.47 | 1.1 | 1.6 | 52 |
|  | Ba-ETS-10 | 1.38 | 0.89 | 1.2 | 32 |
|  | Ba/H-ETS-10 | 1.58 | 0.49 | 0.78 | 15 |
| $C_2H_6$ | Na-ETS-10 | 1.32 | 63 | 83 | N/A |
|  | Ba-ETS-10 | 1.62 | 23 | 38 | N/A |
|  | Ba/H-ETS-10 | 1.39 | 8.8 | 12 | N/A |

The Henry's constants follow the sequence: Na>Ba>Ba/H for both methane and ethane. The equilibrium constant for ethane on Na-ETS-10 ($b_i$) which has the most rectangular-shaped isotherm, was calculated to be $6.3 \times 10^{-1}$ kPa$^{-1}$, whereas the Ba/H-ETS-10 isotherm, which approaches linearity, yields an equilibrium constant of $8.8 \times 10^{-2}$ kPa$^1$. Ba-ETS-10, which has an ethane isotherm of intermediate shape, also has an intermediate $b_i$ value of $2.3 \times 10^{-1}$ kPa$^{-1}$. The ID; values for methane are much lower, ranging from $4.9 \times 10^{-3}$ kPa$^{-1}$ on Ba/H-ETS-10 to $1.1 \times 10^{-2}$ kPa$^{-1}$ on Na-ETS-10, and reflecting the nearly linear methane isotherms observed in FIG. 1. Without wishing to be bound by theory, the methane isotherms are indicative of void filling by methane within the ETS-10 materials, and do not reflect an adsorptive interaction between methane and the sorbent. The $K_i$ values for each adsorbent/gas combination were used to calculate the limiting or Henry's selectivity (a) for ethane over methane for the three materials (Table 1). At a lower pressure regime of from 0 to 100 kPa, the ranking of the different ETS-10 forms, ranging from the most selective to the least selective is: Na>Ba>Ba/H. The lowest selectivity is 15 (for Ba/H-ETS-10), while the Na-ETS-10 form has a limiting selectivity for ethane over methane of 52 at 298 K.

Figure 2:
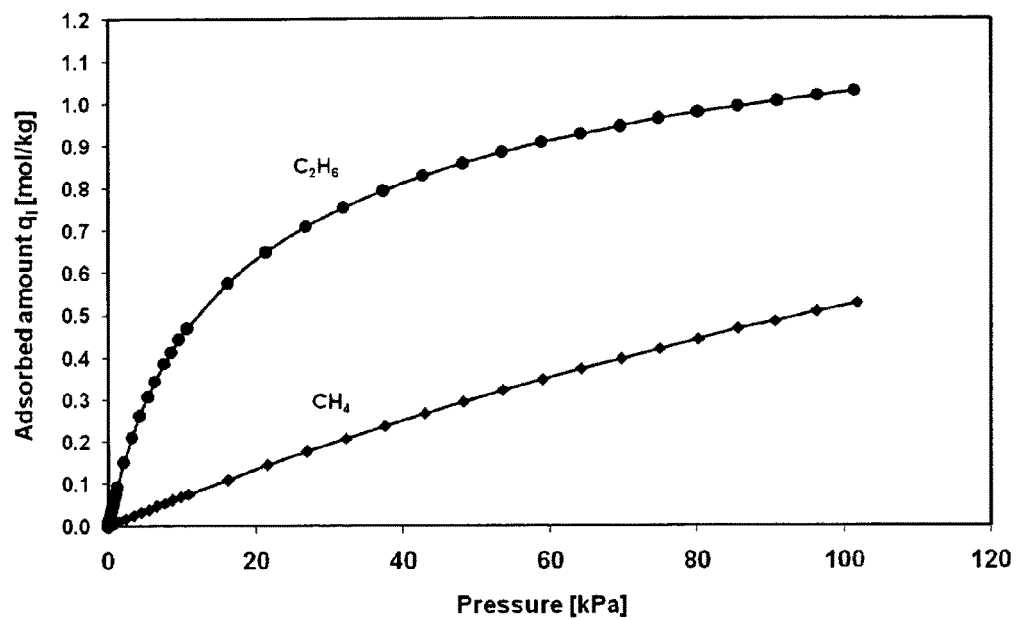
FIG. 2. Adsorption isotherms for ethane (circles) and methane (diamonds) on Na-ETS-10 at 343 K.

Methane and ethane single component adsorption isotherms at 343 K and from 0-100 kPa for Na-ETS-10 are shown in FIG. 2. Values from these higher temperature adsorption isotherms were fitted with the Langmuir model (as described above) and the ethane/methane Henry's selectivity (α) was calculated based on the corresponding Henry's Law constants ($K_i$). Na-ETS-10 remains selective for ethane over methane at 343 K, with an observed selectivity of 10 (Table 2).

TABLE 2

Adsorption Parameters for Ethane and Methane on ETS-10 Materials at 343 K

| Sorbate | Adsorbent | Saturation Adsorption Capacity $q_{i,m}$ (mol/kg) | Equilibrium Constant $b_i \times 10^2$ (kPa$^{-1}$) | Henry's Law Constant $K_i \times 10^2$ (mol/kg kPa) | Selectivity α ($C_2H_6$/$C_2H_4$) |
|---|---|---|---|---|---|
| $CH_4$ | Na-ETS-10 | 1.89 | 0.38 | 0.72 | 10 |
| $C_2H_6$ | Na-ETS-10 | 1.16 | 6.3 | 7.3 | N/A |

Example 2

Single Component Adsorption Isotherms: High Pressure Regime (0-1800 kPa)

Without wishing to be bound by theory, adsorption capacity ($q_{i,m}$) measurements are generally more accurate when taken at high pressure. Hence, single adsorption isotherms of $CH_4$ and $C_2H_6$ on Na-ETS-10 crystals were evaluated at 298 K over a pressure range of 0 to 1800 kPa. The adsorption data were fitted with a Langmuir model and the adsorption parameters are shown in Table 3. The observed saturation adsorption capacities of Na-ETS-10 for methane and ethane are higher than those predicted using low pressure measurements (compare data in Tables 1 and 3).

TABLE 3

Adsorption Parameters for Ethane and Methane on Na-ETS-10
Materials at 298 K From Single Adsorption Isotherms Evaluated
in a Pressure Range From 0 to 1800 kPa

| Gas | Adsorbent | Saturation Adsorption Capacity $q_{i,m}$ (mol/Kg) | Equilibrium Constant $b_i \times 10^3$ (kPa$^{-1}$) |
|---|---|---|---|
| $CH_4$ | Na-ETS-10 | 1.98 | 0.008 |
| $C_2H_6$ | Na-ETS-10 | 1.88 | 0.369 |

Example 3

Breakthrough Curves for Binary Methane/Ethane and Synthetic Natural Gas Mixtures a) Breakthrough experiments were performed using 25 g samples of each pelletized, ground and sieved test adsorbent. Na-, Ba- and Ba/H-ETS-10 adsorbents were packed into a 40 cc cylindrical stainless steel chamber with an outer diameter of 31.22 mm and a length of 75.59 mm. Following adsorbent loading, columns were activated at 473 K for 10 h under 30 cm$^3$/min of helium flow.

A synthetic natural gas feed gas mixture (90.99 mol % $CH_4$; 5.60 mol % $C_2H_6$; 1.63 mol % $C_3H_5$; 0.69 mol % $CO_2$; 0.50 mol % $N_2$; 0.49 mol % $C_4H_{10}$; 0.10 mol % $C_5H_{12}$ to approximate raw natural gas) was introduced into the fixed-bed columns at a flow rate of 170 standard cubic centimeters per minute, sccm (298 K, 101.3 kPa). The column pressure and temperature were maintained at 101.3 kPa and 298 K. Outlet gas composition was analyzed using a Varian 3800 gas chromatograph equipped with an HAYESEP Q column and a thermal conductivity detector.

Ethane breakthrough curves using the synthetic natural gas feed mixture are shown in FIG. 3 for Na-, Ba- and Ba/H-ETS-10. The breakthrough concentration profiles were expressed as a function of the number of bed volumes of natural gas that flow through the packed bed before ethane begins to elute from the column. It is clear that it is possible to separate pure methane from ethane during the early stages of the breakthrough. Na-ETS-10 had the largest capacity for ethane, 175 bed volumes. Bed volumes of 114 and 13 were observed for Ba-ETS-10 and Ba/H-ETS-10 breakthrough, respectively. These breakthrough curves are performed in a simulated natural gas atmosphere and, therefore, competitive adsorption of ethane with propane, butane and pentane is expected.

Na-ETS-10 combines a large limiting selectivity for ethane over methane ($\alpha$=52) with a large ethane capacity (175 bed volumes) at 298 K and 101.3 kPa. Ba-ETS-10 has somewhat lower limiting selectivity and reduced, but still significant, ethane capacity. However, much lower ethane capacity was observed for the Ba/H-exchanged form of ETS-10. These characteristics indicate that cation-exchanged ETS-10 has the ability to separate ethane from methane at room temperature, and that the characteristics of the adsorbent can be manipulated through cation exchange in order to optimize the material for a selected separation. These results further illustrate that it is possible to design and optimize an adsorption-based separation process for the extraction of ethane from methane-rich gas streams using ETS-10 zeolitic materials.

b) A binary methane/ethane (93/7 mol %) feed gas mixture was introduced into a fixed bed column of Na-ETS-10 at a flow rate of 250 standard cubic centimeters per min (sccm). Breakthrough experiments were performed using a 30 g sample of pelletized, ground and sieved test adsorbent. The Na-ETS-10 adsorbent was packed into a 50 cc cylindrical stainless steel chamber with an outer diameter of 38 mm and a length of 95 mm. The column pressure and temperature were maintained at 3200 kPa and 298 K respectively. The outlet gas composition was analyzed using a Varian 3800 gas chromatograph equipped with an HAYESEP Q column and a thermal conductivity detector. Breakthrough curves for ethane ($C_2$) and methane ($C_1$) on Na-ETS-10 are shown in FIG. 4. The breakthrough concentration profiles are expressed as a function of the number of bed volumes of gas mixture that flows through the packed bed before ethane begins to elute from the column. During the first stage (up to 230 bed volumes) the adsorbent bed retained ethane and the outlet stream of the column was free of ethane content (see FIG. 4).

A person skilled in the art will recognize that a methane/ethane feed mixture can be split into a pure methane, or at least a methane rich effluent stream during a high pressure adsorption step, provided that the capacity for the bed to adsorb ethane is not exceeded (e.g. in the present experiment, about 230 bed volumes). In addition, an effluent stream which is enriched in ethane relative to the methane/ethane feed mixture can be obtained by desorption methods.

c) A synthetic natural gas feed gas mixture (90.99 mol % $CH_4$; 5.60 mol % $C_2H_6$; 1.63 mol % $C_3H_8$; 0.69 mol % $CO_2$; 0.50 mol % $N_2$; 0.49 mol % $C_4H_{10}$; 0.10 mol % $C_5H_{12}$ to approximate raw natural gas) was introduced into a fixed-bed column of Na-ETS-10 at a flow rate of 250 sccm. Breakthrough experiments were performed using a 30 g sample of pelletized, ground and sieved test adsorbent. The Na-ETS-10 adsorbent was packed into a 50 cc cylindrical stainless steel chamber with an outer diameter of 38 mm and a length of 95 mm. The column pressure and temperature were maintained at 3200 kPa and 298 K respectively. The outlet gas composition was analyzed using a Varian 3800 gas chromatograph equipped with an HAYESEP Q column and a thermal conductivity detector. Methane, ethane and propane breakthrough curves are shown in FIG. 5. The breakthrough concentration profiles were expressed as a function of the number of bed volumes of natural gas that flow through the packed bed before ethane begins to elute from the column and before propane elutes from the column.

Three different zones can be observed in the breakthrough profile (FIG. 5). In the Zone A (up to about 60 bed volumes), all hydrocarbons other than methane are completely retained on the adsorbent bed. During this period, the effluent stream is free of all ethane and $C_{3+}$ paraffinic species. Hence, the effluent stream from Zone A is a "pure" methane stream with respect to paraffinic content. A person skilled in the art will recognize that such a methane rich stream could be merged into a pipeline network for consumption purposes, and because the original adsorptive separation can be carried out at high pressure, there may be no need for further pressurization or recompression steps. For example, a natural gas feed stream at high pressure can be fed to an adsorbent bed comprising ETS-10 materials. In Zone A, a pure methane effluent stream can be obtained and returned to the natural gas pipeline while the adsorbent bed retains the adsorbed ethane and $C_{3+}$ paraffinic hydrocarbons. In the present example, the capacity of the Na-ETS-10 adsorbent to provide a methane-only stream at high pressures (3200 kPa) is 60 bed volumes.

In Zone B, which in the present example covers 60 to 150 bed volumes, the only hydrocarbons which are found in the effluent stream are methane and ethane with a $C_1/C_2$ ratio average of about 97/3 molar ratio (note: this ratio is similar to the feed mixture separated in example 3b above as further shown in FIG. 4). Propane and larger hydrocarbons were still being adsorbed by the ETS-10 material during this period. Hence it is possible to generate an effluent stream which contains only methane and ethane with respect to paraffinic hydrocarbon content.

In Zone C, which is reached after 150 bed volumes, the effluent stream includes methane, ethane and propane, while larger hydrocarbons such as butane and isobutane are absent due to retention by the ETS-10 adsorbent material. The composition of the effluent stream in Zone C was approximately: 93 mol % methane; 5 mol % ethane; 2 mol % propane.

A person skilled in the art will recognize that the effluent stream obtained in Zone B can be further recycled, by for example passage through yet another adsorption bed comprising an ETS-10 material, to further separate ethane by selective adsorption. Subsequent desorption would provide an effluent stream which is further enriched in ethane and free from $C_{3+}$ paraffinic hydrocarbons. Similarly, the effluent stream obtained in Zone C can be recycled back into a process node or step in which it is further combined with an ETS-10 material to further separate ethane and $C_{3+}$ paraffinic components by selective adsorption relative to methane.

Example 4

Figure 6:
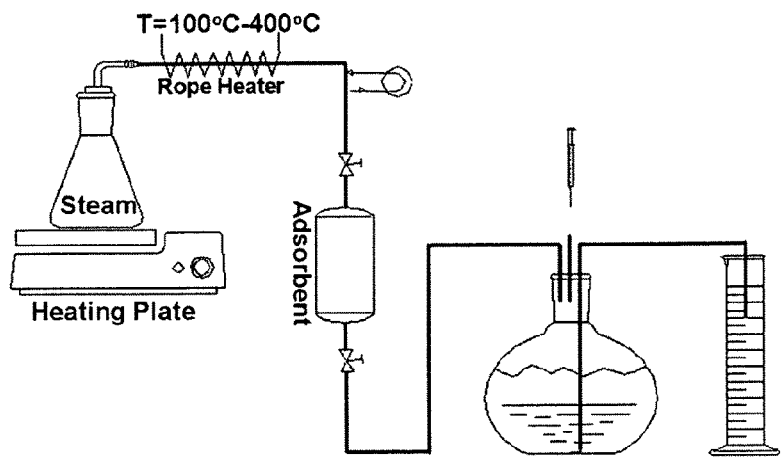
FIG. 6. Schematics of the laboratory-scale steam (A) and microwave (B) desorption processes.
Figure 6:
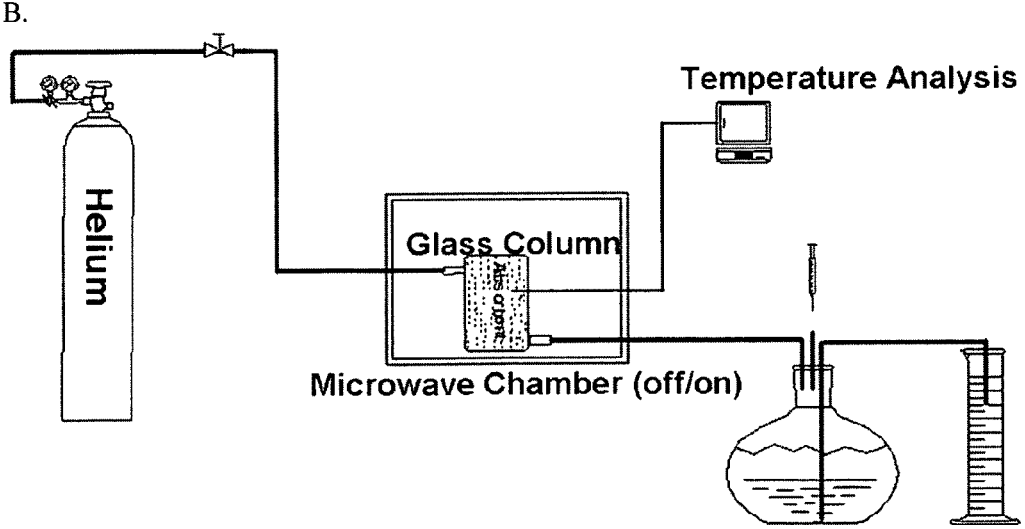

Desorption using Steam and Microwave Radiation: Adsorption Selectivity at High Pressure Schematics of a steam desorption apparatus and an alternate microwave desorption apparatus are shown in FIG. 6. For steam desorption experiments, when the adsorbent within the column approached equilibrium with the feed gas mixture, the column pressure was released against the ambient conditions and the adsorbed phase on the bed was desorbed using steam (FIG. 6A). Steam was generated in a heated container and passed through the double-ended chamber by opening the upstream valve. The temperature of the steam entering the double-ended chamber was maintained above 200° C. (473 K). Gas desorbed from the adsorbent flowed into the downstream flask, displacing water. The volume of displaced water was equal to the volume of outlet gas. Outlet gas was sampled and analyzed using a Varian 3800 gas chromatograph equipped with an HAYESEP Q column and a thermal conductivity detector. After desorption was complete, the sorbent was thermally re-activated at 150° C. for 10 h prior to initiation of further adsorption/desorption cycles. A schematic of the (alternative) microwave desorption apparatus is shown in FIG. 6B. In this approach, when the adsorbent within the column approaches equilibrium with the feed gas mixture, the column pressure would be released against the ambient conditions and the adsorbed phase on the bed would be desorbed using microwave heating. Gas samples would be collected and analyzed in a manner analogous to the steam-desorbed samples.

a) For methane/ethane (93/7 mol %) mixtures on Na-ETS-10, the feed gas was flowed onto the packed bed column (at a range of column pressures) until the adsorbent within the column approached equilibrium with the feed gas mixture. Next, the column pressure was released against the ambient conditions and the adsorbed phase on the bed was desorbed using steam. The desorbed phase represents the extract stream. The mole fractions of the extract are shown in FIG. 7 as a function of the packed bed column pressure. Essentially, the extract composition did not change over the entire range of column pressures (450-5600 kPa). The extract mole fractions were approximately 75% for $C_2H_6$ and approximately 25% for $CH_4$ in all samples measured.

Separation selectivity for Na-ETS-10 was defined in terms of the extract composition and the feed mixture fractions:

$$S = \frac{X_{C_2}}{X_{C_1}} \bigg/ \frac{Y_{C_2}}{Y_{C_1}},$$

where X and Y are the mole fractions in the extract and feed gas, respectively. The selectivity averaged 40 for all the tested pressures, even at higher pressures (5600 kPa) similar to typical natural gas pipeline pressures (FIG. 7). The data shows that a methane stream containing 7 mol % ethane can be enriched up to 75 mol % ethane by using common adsorption-desorption steps. The data further shows that ethane enrichment of the recovered extract stream remains constant as the pressure of the feed gas increases. Hence practical higher pressure separation of ethane from natural gas using ETS-10 type materials in an adsorption process is possible.

Figure 8:
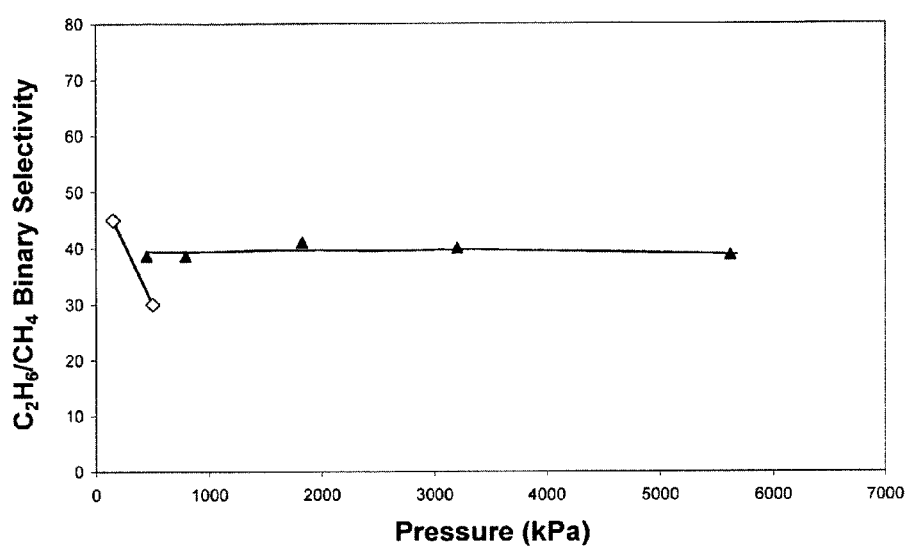
FIG. 8. Observed ethane/methane selectivity (closed triangles, solid line) in a desorbed effluent stream as a function of Na-ETS-10 adsorption column pressure. Equilibrium selectivity reported by Al-Baghli and Loughlin in Journal of Chemical and Engineering Data 2006, v51, p. 248-254 (open diamonds, solid line) at 280K. Feed mixture: 93/7 methane/ethane. Feed rate: 250 sccm. Column temperature: 298 K.

FIG. 8 shows ethane/methane selectivity on Na-ETS-10 as a function of pressure. The data show that adsorption selectivity for ethane relative to methane is high even at higher pressures (above 5000 kPa).

For comparative purposes the published experimental values for the adsorptive separation of methane and ethane reported by Al-Baghli and Loughlin are included (see Al-Baghli, N. A., Loughlin, K. F. Journal of Chemical and Engineering Data, 2006, v51, 248-254). The Al-Baghli reference reported low pressure equilibrium adsorbate selectivity for binary methane/ethane mixtures on as prepared Na/K-ETS-10, but did not explore methane/ethane adsorption behaviour at higher pressures similar to natural gas pipeline pressures. In fact, projection of the Al-Baghli and Loughlin low pressure data (FIG. 8, open diamonds) indicates that selectivity declines with pressure, and indicates that higher pressures would negatively impact selectivity for ethane over methane.

b) In the case of a synthetic natural gas feed, after approximately 850 bed volumes of gas flow, the Na-ETS-10 adsorbent column approaches equilibrium with the feed mixture (FIG. 5) and the adsorbate phase is composed of larger, more valuable hydrocarbons including propane, butane, isobutene and pentane. When the column pressure is released against the ambient conditions and the adsorbed phase on the bed is desorbed using steam, the desorbed phase represents the extract stream. The resulting extract composition was analyzed using a Varian 3800 gas chromatograph equipped with an HAYESEP Q column and a thermal conductivity detector. When the extract compositions from separations performed at two different column pressures (1800 kPa and 3200 kPa) were compared, the (ethane+$C_3$) paraffin/methane molar ratio in the extract was found to increase with column pressure (FIG. 9). At 1800 kPa (261 psia), the ratio is 3.3, while at 3200 kPa (464 psia), the ratio is 4.6. Based on these results, ethane/methane and $C_{3+}$/methane ratios increase as the column pressure increases which is unexpected in view of the Al-Baghli reference discussed above.

FIG. 9 shows experimentally, that as the pressure increases, the selectivity of Na-ETS-10 for ethane and $C_{3+}$ paraffins over methane increases The above examples show that the adsorption characteristics of ETS-10 materials can be manipulated through modification procedures such as through cationic exchange reactions. Further, it is clear from the above examples that ETS-10 materials have potential for use as an adsorbent for the removal of ethane (and $C_{3+}$ paraffins) from natural gas streams at higher pressures, including pressures above 800 psia, which could strongly reduce the cost of natural gas purification and separation processes when compared to conventional cryogenic separation techniques.

What is claimed is:

1. A process to selectively remove ethane and, if present, $C_{3+}$ paraffins from a mixture comprising methane, ethane and optionally $C_{3+}$ paraffins, said process comprising contacting said mixture with an ETS-10 type material at a pressure of at least 200 psia.

2. The process of claim 1, wherein said mixture comprises primarily methane and ethane.

3. The process of claim 1, wherein said mixture is a natural gas stream.

4. The process of claim 2, wherein said mixture is contacted with said ETS-10 type material at a pressure of at least 400 psia.

5. The process of claim 3, wherein said natural gas stream is contacted with said ETS-10 type material at a pressure of at least 500 psia.

6. The process of claim 1, wherein said ETS-10 type material is an as-prepared ETS-10 zeolite.

7. The process of claim 1, wherein said ETS-10 type material is a cationically modified ETS-10 zeolite.

8. The process of claim 1, wherein said ETS-10 type material is structurally modified ETS-10 zeolite.

9. A swing adsorption process for separating ethane and optionally $C_{3+}$ paraffins from a mixture comprising methane, ethane and optionally $C_{3+}$ paraffins, said process comprising:
  i) passing said mixture through an adsorbent bed comprising an ETS-10 type material at a pressure at of at least 200 psia wherein ethane and, if present, $C_{3+}$ paraffins are selectively adsorbed relative to methane, to give an adsorption effluent stream;
  ii) recovering a desorption effluent stream from said adsorbent bed by carrying out one or more of the following:
    a) reducing the pressure in said adsorbent bed;
    b) increasing the temperature in said adsorbent bed;
  wherein said adsorption effluent stream is enriched in methane relative to said mixture and said desorption effluent stream is enriched in ethane and optionally $C_{3+}$ paraffins relative to said mixture.

10. The process of claim 9, wherein said mixture is a natural gas stream.

11. The process of claim 9, wherein the process is a cycle swing adsorption process.

12. A process for separating ethane and optionally $C_{3+}$ paraffins from a mixture comprising methane, ethane and optionally $C_{3+}$ paraffins, said process comprising:
  i) passing said mixture through an adsorbent bed comprising an ETS-10 type material at a pressure at of at least 200 psia wherein ethane and, if present, $C_{3+}$ paraffins are selectively adsorbed relative to methane, to give an adsorption effluent stream;
  ii) recovering a desorption effluent stream from said adsorbent bed by contacting the adsorbent bed with water;
  wherein said adsorption effluent stream is enriched in methane relative to said mixture and said desorption effluent stream is enriched in ethane and optionally $C_{3+}$ paraffins relative to said mixture.

13. The process of claim 12, wherein said adsorbent bed is regenerated by heating the adsorbent bed, optionally at reduced pressure, to remove water.

14. A process comprising contacting a feed mixture comprising methane, ethane and at least one $C_{3+}$ paraffin with an adsorption bed comprising an ETS-10 type material, at a specific temperature and pressure, for a number of bed volumes which under the chosen temperature and pressure conditions exceeds the breakthrough volume for ethane but which does not exceed the breakthrough volume for $C_{3+}$ paraffins, said process giving an effluent stream which is enriched in methane and ethane relative to said feed mixture and which is essentially free of $C_{3+}$ paraffins.

15. The process of claim 14, further comprising a step of contacting said effluent stream which is enriched in methane and ethane with an ETS-10 type material to selectively adsorb ethane.

16. The process of claim 14 wherein said specific pressure is at least 200 psia.

17. A process comprising passing a feed mixture comprising methane, ethane and optionally present $C_{3+}$ paraffins through an adsorption bed comprising an ETS-10 type material, at a specific temperature and pressure, for a number of bed volumes which under the chosen temperature and pressure conditions does not exceed the breakthrough volume for ethane or, if present, $C_{3+}$ paraffins, said process giving an effluent stream enriched in methane relative to said mixture and which is essential free of ethane and $C_{3+}$ paraffins.

18. The process of claim 17 wherein said specific pressure is at least 200 psia.

* * * * *